United States Patent
Yamahara

(10) Patent No.: US 9,774,592 B2
(45) Date of Patent: Sep. 26, 2017

(54) INFORMATION PROCESSING APPARATUS, INFORMATION PROCESSING METHOD, AND INFORMATION PROCESSING PROGRAM

(71) Applicant: Rakuten, Inc., Tokyo (JP)

(72) Inventor: Hisanori Yamahara, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 133 days.

(21) Appl. No.: 14/655,548

(22) PCT Filed: Jun. 26, 2014

(86) PCT No.: PCT/JP2014/066992
§ 371 (c)(1),
(2) Date: Jun. 25, 2015

(87) PCT Pub. No.: WO2015/198450
PCT Pub. Date: Dec. 30, 2015

(65) Prior Publication Data
US 2016/0261580 A1    Sep. 8, 2016

(51) Int. Cl.
*H04L 29/06* (2006.01)
*G06F 21/46* (2013.01)

(52) U.S. Cl.
CPC ............ *H04L 63/083* (2013.01); *G06F 21/46* (2013.01)

(58) Field of Classification Search
CPC .................................. G06F 21/45; G06F 21/46
See application file for complete search history.

(56) References Cited

U.S. PATENT DOCUMENTS

| | | | | |
|---|---|---|---|---|
| 6,643,784 B1 * | 11/2003 | McCulligh | ............ | H04L 63/083 704/10 |
| 8,689,001 B1 * | 4/2014 | Satish | .................... | G06F 21/46 713/182 |
| 8,769,607 B1 * | 7/2014 | Jerdonek | ................. | G06F 21/31 726/1 |
| 2004/0111646 A1 * | 6/2004 | Little | ..................... | G06F 21/36 726/19 |
| 2004/0177272 A1 * | 9/2004 | Walters | ................... | G06F 21/46 713/183 |

(Continued)

FOREIGN PATENT DOCUMENTS

JP    2012-83917 A    4/2012

OTHER PUBLICATIONS

International Search Report for PCT/JP2014/066992 dated Sep. 30, 2014 [PCT/ISA/210].

*Primary Examiner* — Khang Do
(74) *Attorney, Agent, or Firm* — Sughrue Mion, PLLC

(57) ABSTRACT

An object is to maintain an input load of authentication information properly while assuring safety. An information processing apparatus obtains authentication information conforming to a predetermined requirement of complexity. The information processing apparatus obtains cost of an input operation of each of a plurality of codes included in the authentication information. On the basis of the obtained costs, the information processing apparatus calculates an input cost of the authentication information. The information processing apparatus determines propriety of the authentication information on the basis of the calculated input cost.

11 Claims, 17 Drawing Sheets

S1

(56) References Cited

U.S. PATENT DOCUMENTS

| | | | |
|---|---|---|---|
| 2008/0072320 A1* | 3/2008 | Hurley | G06F 21/46 726/21 |
| 2009/0313696 A1* | 12/2009 | Himberger | G06F 21/46 726/22 |
| 2014/0181922 A1* | 6/2014 | Jakobsson | H04L 63/083 726/5 |
| 2015/0067760 A1* | 3/2015 | Waltermann | G06F 21/6218 726/1 |
| 2015/0199500 A1* | 7/2015 | Jagtap | H04L 63/083 726/1 |
| 2015/0319039 A1* | 11/2015 | Generozova | G06F 9/44505 709/220 |

* cited by examiner

S1

AUTHENTICATION DEVICE
(TERMINAL DEVICE)

S2

| IMMEDIATELY PRECEDING \ TARGET | ENGLISH LOWERCASE CHARACTER | ENGLISH UPPERCASE CHARACTER | NUMBER |
|---|---|---|---|
| NONE | 1 | 2 | 2 |
| ENGLISH LOWERCASE CHARACTER | 1 | 2 | 2 |
| ENGLISH UPPERCASE CHARACTER | 1 | 2 | 2 |
| NUMBER | 2 | 3 | 1 |

| IMMEDIATELY PRECEDING \ TARGET | a | ... | z | A | ... | Z | 0 | ... | 9 |
|---|---|---|---|---|---|---|---|---|---|
| NONE | 1 | ... | 1 | 2 | ... | 2 | 2 | ... | 2 |
| a | 1 | ... | 1 | 2 | ... | 2 | 2 | ... | 2 |
| ... | ... | ... | ... | ... | ... | ... | ... | ... | ... |
| A | 1 | ... | 1 | 2 | ... | 2 | 2 | ... | 2 |
| ... | ... | ... | ... | ... | ... | ... | ... | ... | ... |
| 0 | 2 | ... | 2 | 3 | ... | 3 | 1 | ... | 1 |
| ... | ... | ... | ... | ... | ... | ... | ... | ... | ... |

| IMMEDIATELY PRECEDING \ TARGET | a | b | c | d | ... | A | B | C | D | ... | 0 | 1 | ... |
|---|---|---|---|---|---|---|---|---|---|---|---|---|---|
| NONE | 1 | 2 | 3 | 1 | ... | 4 | 5 | 6 | 4 | ... | 2 | 2 | ... |
| a | 2 | 3 | 4 | 1 | ... | 5 | 6 | 7 | 4 | ... | 2 | 2 | ... |
| b | 2 | 3 | 4 | 1 | ... | 5 | 6 | 7 | 4 | ... | 2 | 2 | ... |
| ... | ... | ... | ... | ... | ... | ... | ... | ... | ... | ... | ... | ... | ... |
| A | 2 | 3 | 4 | 1 | ... | 5 | 6 | 7 | 4 | ... | 2 | 2 | ... |
| B | 2 | 3 | 4 | 1 | ... | 5 | 6 | 7 | 4 | ... | 2 | 2 | ... |
| ... | ... | ... | ... | ... | ... | ... | ... | ... | ... | ... | ... | ... | ... |
| 0 | 2 | 3 | 4 | 2 | ... | 5 | 6 | 7 | 5 | ... | 1 | 1 | ... |
| 1 | 2 | 3 | 4 | 2 | ... | 5 | 6 | 7 | 5 | ... | 1 | 1 | ... |
| ... | ... | ... | ... | ... | ... | ... | ... | ... | ... | ... | ... | ... | ... |

| IMMEDIATELY PRECEDING \ TARGET | a | b | c | d | ... | A | B | C | D | ... | 0 | 1 | ... |
|---|---|---|---|---|---|---|---|---|---|---|---|---|---|
| NONE | 1 | 2 | 2 | 1 | ... | 2 | 3 | 3 | 2 | ... | 2 | 2 | ... |
| ENGLISH LOWERCASE CHARACTER | 1 | 2 | 2 | 1 | ... | 2 | 3 | 3 | 2 | ... | 2 | 2 | ... |
| ENGLISH UPPERCASE CHARACTER | 2 | 3 | 3 | 2 | ... | 1 | 2 | 2 | 1 | ... | 3 | 3 | ... |
| NUMBER | 1 | 2 | 2 | 1 | ... | 2 | 3 | 3 | 2 | ... | 2 | 2 | ... |

FIG.7

| IMMEDIATELY PRECEDING \ TARGET | a | b | c | d | ... | A | B | C | D | ... | O | ... |
|---|---|---|---|---|---|---|---|---|---|---|---|---|
| NONE | 1 | 1 | 1 | 1 | ... | 2 | 2 | 2 | 2 | ... | 1 | ... |
| a | 1 | 1 | 1 | 1 | ... | 2 | 2 | 2 | 2 | ... | 1 | ... |
| b | 1 | 1 | 1 | 1 | ... | 2 | 2 | 2 | 2 | ... | 1 | ... |
| c | 1 | 1 | 1 | 1.5 | ... | 2 | 2 | 2 | 2.5 | ... | 1 | ... |
| d | 1 | 1 | 1.5 | 1 | ... | 2 | 2 | 2.5 | 2 | ... | 1 | ... |
| ... | ... | ... | ... | ... | ... | ... | ... | ... | ... | ... | ... | ... |
| A | 1 | 1 | 1 | 1 | ... | 1 | 1 | 1 | 1 | ... | 1 | ... |
| ... | ... | ... | ... | ... | ... | ... | ... | ... | ... | ... | ... | ... |
| H | 1 | 1 | 1 | 1 | ... | 2 | 2 | 2 | 2 | ... | 1 | ... |
| ... | ... | ... | ... | ... | ... | ... | ... | ... | ... | ... | ... | ... |
| O | 1 | 1 | 1 | 1 | ... | 1 | 1 | 1 | 1 | ... | 1 | ... |
| ... | ... | ... | ... | ... | ... | ... | ... | ... | ... | ... | ... | ... |

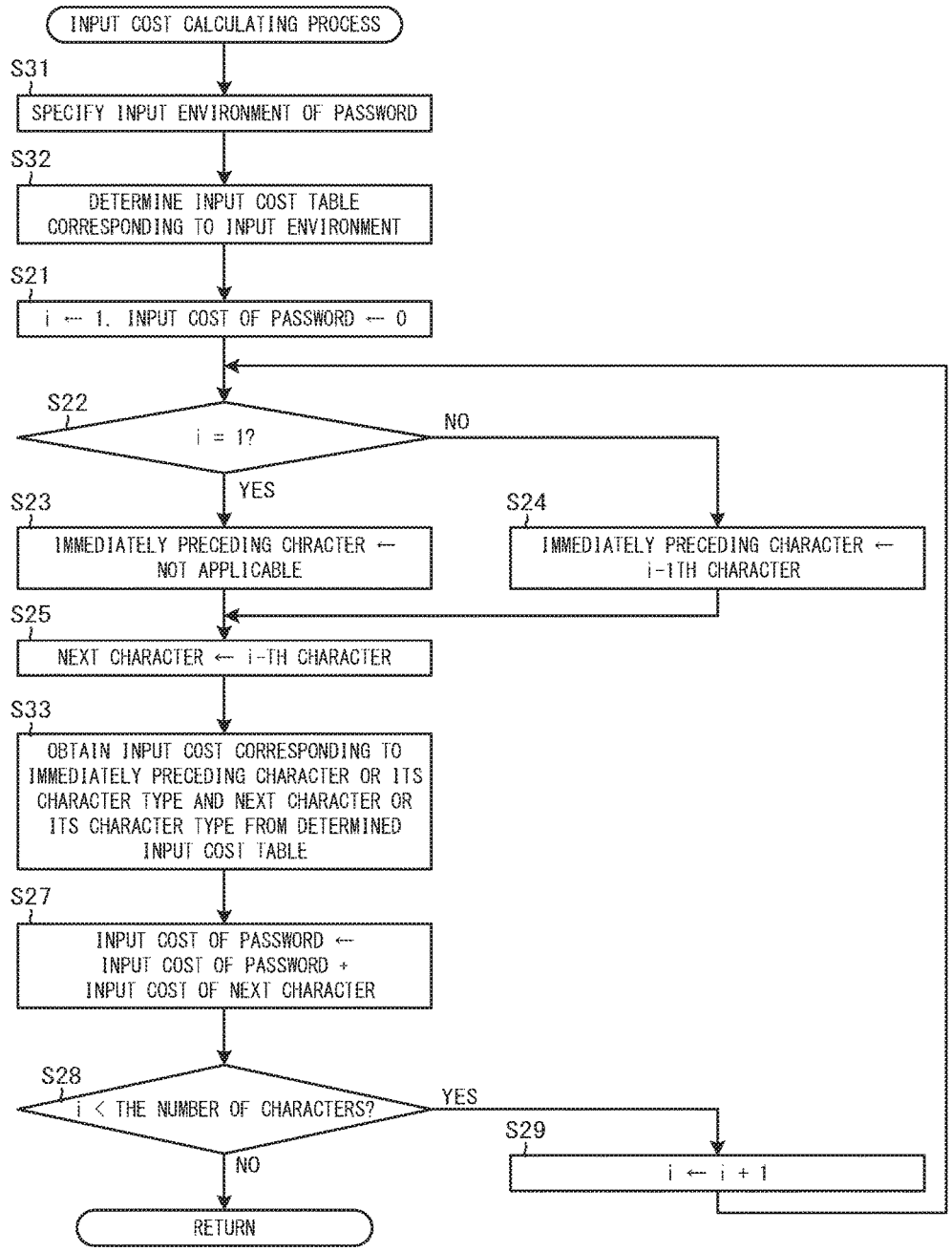

211 — ADD THREE CHARACTERS TO PASSWORD AND RE-ENTER
201 — PASSWORD
202 — REGISTER dAJ395a0 dAJ395a01yz

212 — CHANGE FIFTH CHARACTER TO ALPHABET UPPERCASE CHARACTER AND RE-ENTER
201 — PASSWORD
202 — REGISTER dAJ395a0 dAJ3P5a0

213 — REPLACE THIRD CHARACTER WITH FIFTH CHARACTER AND RE-ENTER
201 — PASSWORD
202 — REGISTER dAJ395a0 dA93J5a0

214 — DELETE FIFTH AND SIXTH CHARACTERS AND RE-ENTER

201 — PASSWORD

202 — REGISTER o472Sj5xw0e o4725xw0e

215 — CHANGE 10TH CHARACTER TO ALPHABET LOWERCASE CHARACTER AND RE-ENTER

201 — PASSWORD

202 — REGISTER o472Sj5xw0e o472Sj5xwae

216 — REPLACE FIFTH CHARACTER WITH TENTH CHARACTER AND RE-ENTER

201 — PASSWORD

202 — REGISTER o472Sj5xw0e o4720j5xwSe

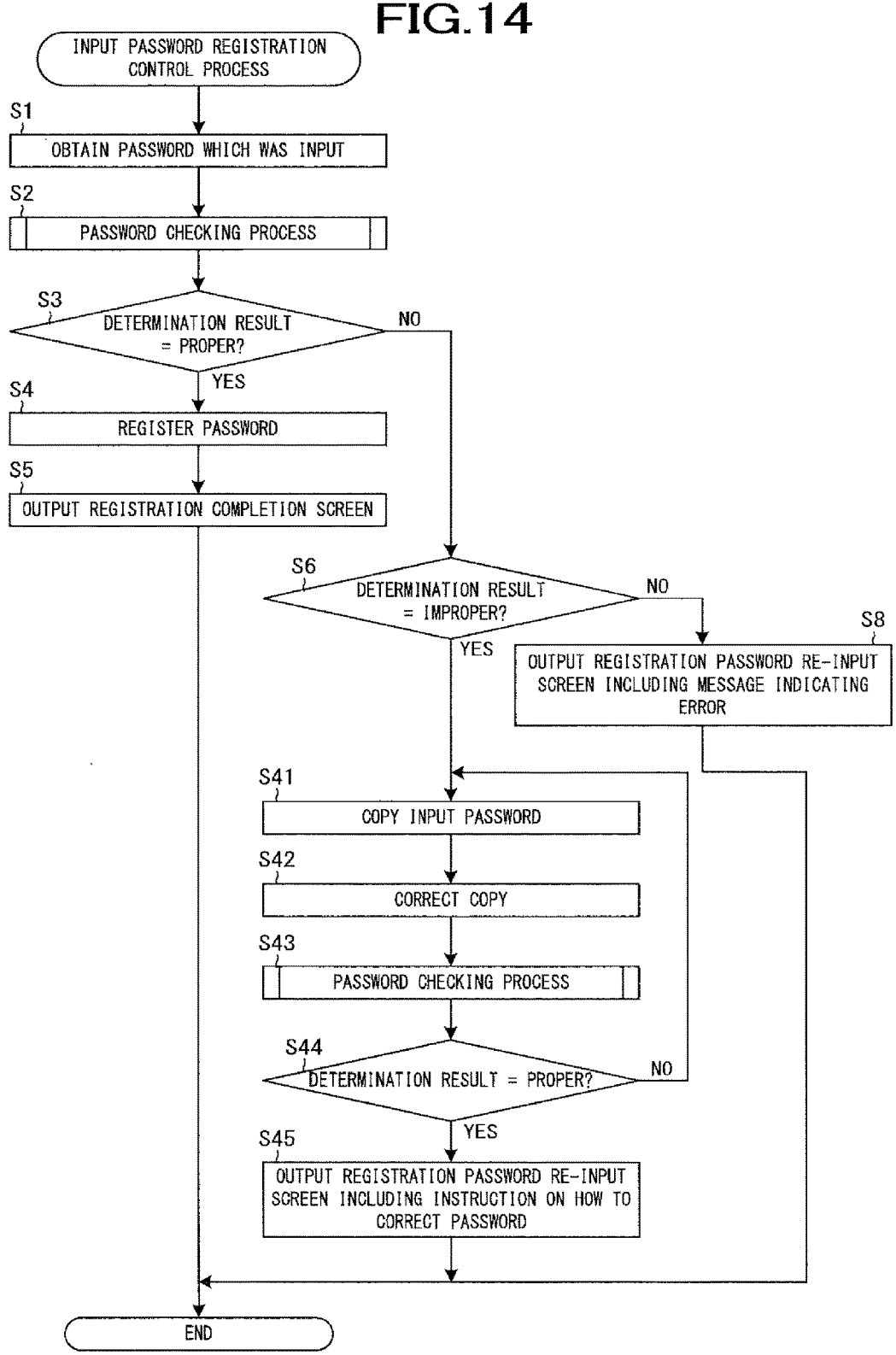

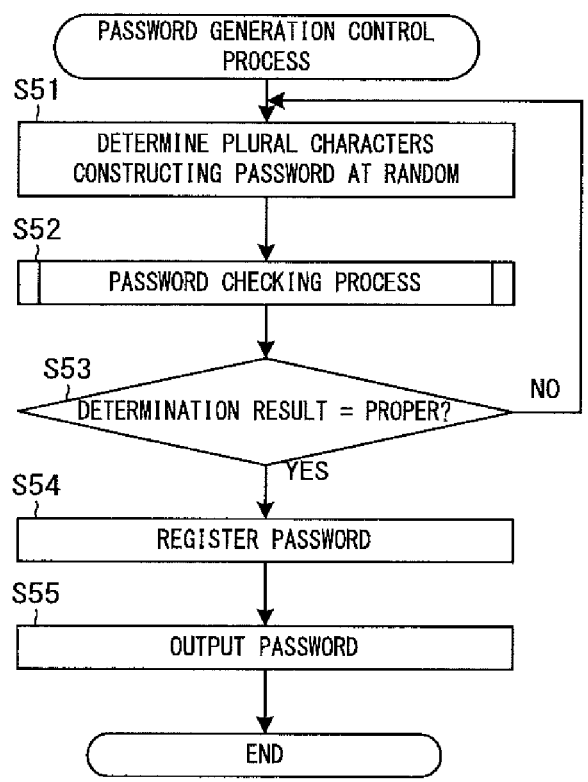

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2014/066992, filed on Jun. 26, 2014, the contents of all of which are incorporated herein by reference in their entirety.

TECHNICAL FIELD

The present invention relates to a technical field of evaluating authentication information used for an authentication.

BACKGROUND ART

Conventionally, as information for authenticating a user, authentication information such as a password is widely used. From viewpoint of safety, it is generally said that authentication information is complicated. For example, Patent Literature 1 discloses that only a password in which the number of characters is equal to or larger than a predetermined number and including a plurality of types of characters is registered.

CITATION LIST

Patent Literature

Patent Literature 1: JP 2012-83917 A

SUMMARY OF INVENTION

Technical Problem

Even among authentication information having the same complexity, in some cases, the input load on the user varies. Consequently, in the case where a password is automatically generated according to, for example, a predetermined requirement of complexity, the user is sometimes forced to have excessive input load. For example, when the user manually sets a password according to a predetermined requirement of complexity, the user tends to set authentication information so that the input load decreases. In this case, it is feared that safety decreases.

The present invention has been achieved in consideration of the above points and an object of the invention is to provide an information processing apparatus, an information processing method, and an information processing program which enable input load of authentication information to be maintained properly while assuring safety.

Solution to Problem

In order to solve the above problem, the invention according to claim 1 is an information processing apparatus comprising: an authentication information obtaining means that obtains authentication information including a plurality of codes and conforming to a predetermined requirement of complexity; a cost obtaining means that obtains a cost of an input operation of each of the plurality of codes included in the authentication information obtained by the authentication information obtaining means; a calculating means that calculates input cost of the authentication information based on costs obtained by the cost obtaining means; and a determining means that determines propriety of the authentication information obtained by the authentication information obtaining means based on the input cost calculated by the calculating means.

According to the invention, the information processing apparatus determines propriety of authentication information on the basis of the input cost of the authentication information based on the costs of input operations of codes included in the authentication information conformed to a predetermined requirement of complexity. Consequently, on the basis of the determination result of propriety, while assuring safety, the input load of the authentication information can be maintained properly.

The invention according to claim 2 is the information processing apparatus according to claim 1, wherein the cost obtaining means obtains the cost based on, in an input environment in which a group of input devices used for input can be switched in a plurality of groups of input devices, the number of times of switching the group of input devices for inputting each of the plurality of codes included in the authentication information, a plurality of codes which can be input being assigned to each of the plurality of groups of input devices.

According to the invention, the input cost proper to the input environment in which the operation of switching the group of input devices is possible can be calculated.

The invention according to claim 3 is the information processing apparatus according to claim 1 or 2, wherein the cost obtaining means obtains the cost based on the number of times of operations for inputting each of the plurality of codes included in the authentication information.

According to the invention, the input cost proper to the input environment in which the number of times of operations varies depending on codes can be calculated.

The invention according to claim 4 is the information processing apparatus according to any one of claims 1 to 3, wherein the cost obtaining means obtains the cost based on, in an input environment that a plurality of input devices to which respective codes which can be input are assigned are disposed, a position of an input device to which each of the plurality of codes included in the authentication information is assigned.

According to the invention, the input cost proper to the input environment in which the input load varies depending on a position of an input device can be calculated.

The invention according to claim 5 is the information processing apparatus according to any one of claims 1 to 4, further comprising a specifying means that specifies an input environment used to input the authentication information, wherein the cost obtaining means obtains the cost based on a rule of determining cost corresponding to the input environment specified by the specifying means.

According to the invention, even when the input environment is not predetermined, the input cost proper to the input environment used to input authentication information can be calculated.

The invention according to claim 6 is the information processing apparatus according to any one of claims 1 to 5, wherein the authentication information obtaining means obtains the authentication information input by a user operation, and the information processing apparatus further includes an output means that outputs the propriety determined by the determining means.

According to the invention, the input load of authentication information which is input by the user can be maintained properly.

The invention according to claim 7 is the information processing apparatus according to claim 6, wherein when it is determined by the determining means that the authentication information is not proper, the output means outputs a way of correcting the authentication information, the way being the correcting way by which the determining means determines the authentication information after the correction is proper.

According to the invention, the user corrects the authentication information on the basis of the output correcting way, so that the input load of the corrected authentication information can be maintained properly.

The invention according to claim 8 is the information processing apparatus according to any one of claims 1 to 5, wherein the authentication information obtaining means generates authentication information conforming to the requirement and repeats the generation of authentication information until the authentication information is determined to be proper by the determining means, and the information processing apparatus further includes an output means that outputs authentication information determined to be proper by the determining means.

According to the invention, the input load of authentication information which is automatically generated can be maintained properly.

The invention according to claim 9 is the information processing apparatus according to claim 8, wherein when it is determined by the determining means that generated authentication information is not proper, the authentication information obtaining means generates, by correcting the authentication information, new authentication information.

According to the invention, it can facilitate to maintain the input load of authentication information generated properly more than generation of new authentication information regardless of the generated authentication information.

The invention according to claim 10 is the information processing apparatus according to any one of claims 1 to 9, further comprising: a type specifying means that specifies a type of a terminal used for inputting the authentication information; and a requirement determining means that determines the requirement of complexity based on the type specified by the type specifying means, wherein the authentication information obtaining means obtains authentication information conforming to the requirement determined by the requirement determining means.

According to the invention, the requirement of complexity of authentication information suitable for the type of a terminal device can be set.

The invention according to claim 11 is an information processing method executed by a computer, comprising: an authentication information obtaining step obtaining authentication information including a plurality of codes and conforming to a predetermined requirement of complexity; a cost obtaining step obtaining a cost of an input operation of each of the plurality of codes included in the authentication information obtained in the authentication information obtaining step; a calculating step calculating input cost of the authentication information based on costs obtained in the cost obtaining step; and a determining step determining propriety of the authentication information obtained in the authentication information obtaining step based on the input cost calculated in the calculating step.

The invention may include an information processing program that causes a computer to function as: an authentication information obtaining means that obtains authentication information including a plurality of codes and conforming to a predetermined requirement of complexity; a cost obtaining means that obtains a cost of an input operation of each of the plurality of codes included in the authentication information obtained by the authentication information obtaining means; a calculating means that calculates input cost of the authentication information based on costs obtained by the cost obtaining means; and a determining means that determines propriety of the authentication information obtained by the authentication information obtaining means based on the input cost calculated by the calculating means.

Advantageous Effects of Invention

According to the present invention, the information processing apparatus determines propriety of authentication information on the basis of the input cost of the authentication information based on the costs of input operations of codes included in the authentication information conformed to a predetermined requirement of complexity. Consequently, on the basis of the determination result of propriety, while assuring safety, the input load of the authentication information can be maintained properly.

BRIEF DESCRIPTION OF DRAWINGS

FIG. 7 is a diagram illustrating an example of an input cost table in the case where the user terminal 2 is a personal computer.

FIG. 11 is a flowchart illustrating an example of the input cost calculating process of the system controller 16 of the authentication device 1 according to an embodiment.

FIG. 14 is a flowchart illustrating an example of an input password registration control process of the system controller 16 in the authentication device 1 according to an embodiment.

FIG. 15 is a flowchart illustrating an example of a password generation control process of the system controller 16 in the authentication device 1 according to an embodiment.

DESCRIPTION OF EMBODIMENTS

Hereinbelow, embodiments of the present invention will be described in detail with reference to the drawings. The embodiments described hereinbelow relate to embodiments in the case of applying the present invention to an authentication device of performing authentication using a password including a plurality of character codes. A password as data actually includes a character code indicative of a character. In the present embodiment, for convenience of explanation, a character code will be also simply called a character. In the present embodiments, a symbol may be also included in characters.

1. First Embodiment

An authentication device is a computer which performs user authentication using a password. At the time of registering or setting a new password, the authentication device determines the propriety of the password. The authentication device may be, for example, a server device or a terminal device. First, the case where the authentication device is applied to a server device will be described, and, finally, the case where the authentication device is applied to a terminal device will be described.

1-1. Outline of Information Processing System

Figure 1A:
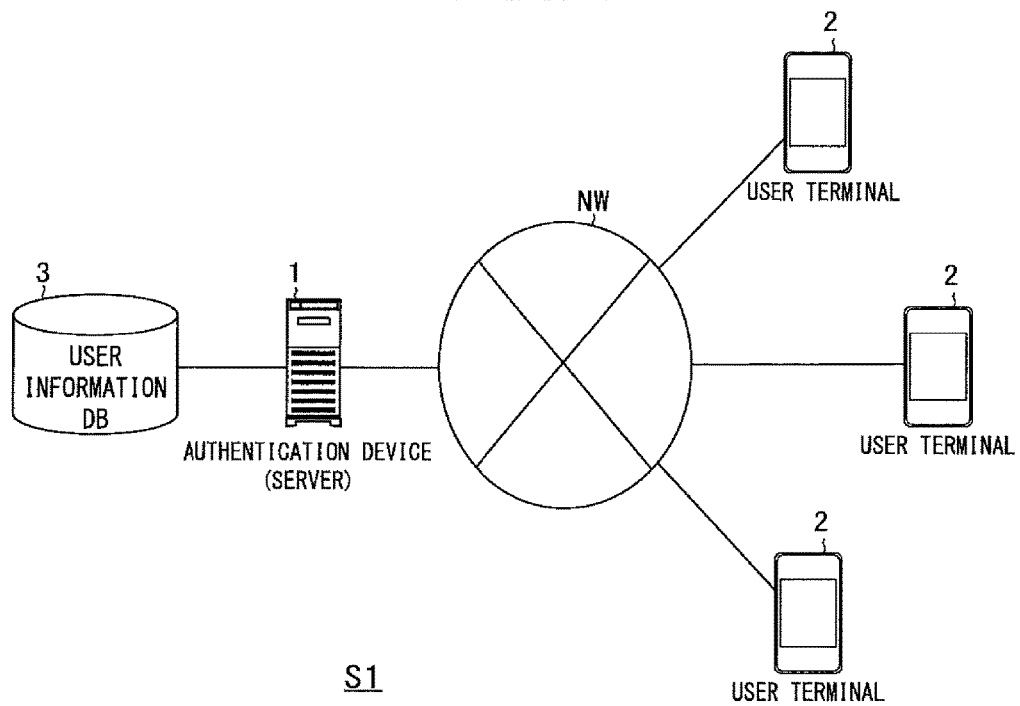
FIG. 1A is a diagram illustrating an example of a schematic configuration of an information processing system S1 in the case of applying an authentication device 1 to a server device.

First, outline of an information processing system S1 according to the embodiment will be described with reference to FIG. 1A. FIG. 1A is a diagram illustrating an example of a schematic configuration of the information processing system S1 in the case of applying an authentication device 1 to a server device.

As illustrated in FIG. 1A, the information processing system S1 includes the authentication device 1 as a server device and a plurality of user terminals 2. The authentication device 1 and the user terminals 2 can mutually transmit/receive data via a network NW using, for example, TCP/IP or the like as a communication protocol. The network NW includes, for example, the Internet, a dedicated communication line (for example, a CATV (Community Antenna Television) line), a mobile communication network (including a base station and the like), a gateway, or the like.

The authentication device 1 may be, for example, a server device performing a process for providing predetermined service to a user of the information processing system S1. Alternatively, the authentication device 1 may be an authentication server performing, for example, user authentication so that the user receives service provided in the information processing system S1. The authentication device 1 is configured so as to be able to access a user information DB 3. The user information DB 3 is a database for registering information regarding users registered as members in the information processing system S1. For example, in the user information DB 3, a user ID, a password, and the like are registered so as to be associated with each user. The user ID is identification information of the user. A password is an example of authentication information in the present invention. The information processing system S1 itself may have the user information DB 3, or the information processing system S1 and the user information DB 3 may be connected to each other via a network. At the time of authenticating a user, the authentication device 1 receives a user ID and a password from the user terminal 2. For example, the authentication device 1 obtains a password corresponding to the received user ID from the user information DB 3 and determines whether the obtained password and the received password match or not. When the passwords match, the authentication device 1 determines that the authentication succeeds, and when the passwords do not match, the authentication device 1 determines that the authentication fails. When the authentication succeeds, the user logs in the information processing system S1.

The user terminal 2 is a terminal device used by a user who intends to use the information processing system S1. In the present embodiment, the user can use the information processing system S1 only by using a specific kind of terminal device. Examples of the kind of the terminal device include a smartphone, a tablet computer, a cellular phone, a personal computer, a PDA (Personal Digital Assistant), and an STB (Set Top Box). The kinds of the terminal devices are classified according to models, sale item series, and the like. The user terminal 2 may have, for example, a CPU, a ROM, a RAM, a flash memory, a hard disk drive, and the like. In the user terminal 2, for example, software such as a browser and an electronic mail client is installed. The user terminal 2 provides a password input environment to the user. The password input environment is, for example, a user interface for inputting a character which can be used for a password. In the present embodiment, it is assumed that the input environment is the same in the plurality of user terminals 2 using the information processing system S1 and only a single input environment is used.

For example, when the user takes the procedure of the member registration in the information processing system S1, the authentication device 1 registers the user ID and the password of the user into the user information DB 3. For example, when the user changes the password, the authentication device 1 registers a new password into the user information DB 3. At this time, the authentication device 1 registers only a password satisfying a predetermined registration requirement. The registration requirement is a condition that a new password is accepted by the information processing system S1 as a password which can be registered or set. Specifically, the registration requirement is a requirement of complexity of a password. A password registered under the registration requirement has predetermined complexity and the password has strength to a certain degree. For example, the registration requirement may be predetermined by the administrator of the information processing system S1. The registration requirement may be, for example, a requirement that the number of characters of a password is a predetermined number or larger. The registration requirement may be, for example, a requirement that the number of characters of a password is equal to or larger than a first predetermined number and equal to or less than a second predetermined number. The registration requirement may be, for example, a requirement that the number of types of characters included in a password is equal to or larger than a predetermined number. The registration requirement may be, for example, a requirement that characters included in a password always include a predetermined type of character. The registration requirement may be, for example, a combination of a plurality of conditions. The administrator can freely determine the type of a character which can be used for a password. Examples of character types include an English lowercase character, an English uppercase character, a numeric character, a sign, and a multibyte character. The multibyte characters include, for example, a Chinese character, a HIRAGANA, a KATAKANA, and the like. The embodiment will be described on assumption that, as an example, an English lowercase character, an English uppercase character, and a numeric character can be used.

When the user enters a password, for example, the input load varies depending on a character which is input. Consequently, passwords satisfying the same registration requirement may have different loads of input by the user depending on the passwords. When the input load of a password is excessively large, an input operation of the password is troublesome for the user. On the other hand, when the input load of a password is small, there is the possibility that safety deteriorates. The reason is that when a third party tries to find out the password of a user, for example, there is the possibility that the third party tries from a password with small input load by a brute-force attack or the like. The authentication device 1 determines propriety of the password on the basis of the input cost of the password so that the input load of the password lies in a proper range while assuring safety. The input cost is, for example, a value indicative of input load. The larger the input load is, the larger the input load of the password is. In the present embodiment, the authentication device 1 determines propriety of a password entered by the user.

1-2. Configuration of Authentication Device

Figure 2B:
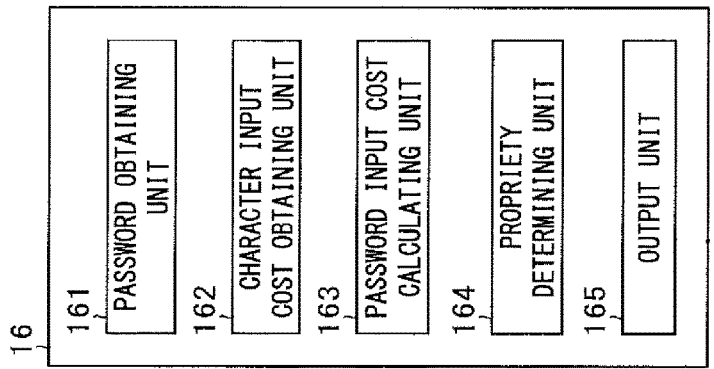
FIG. 2B is a diagram illustrating an example of functional blocks of a system controller 16 of the authentication device 1 according to an embodiment.
Figure 2A:
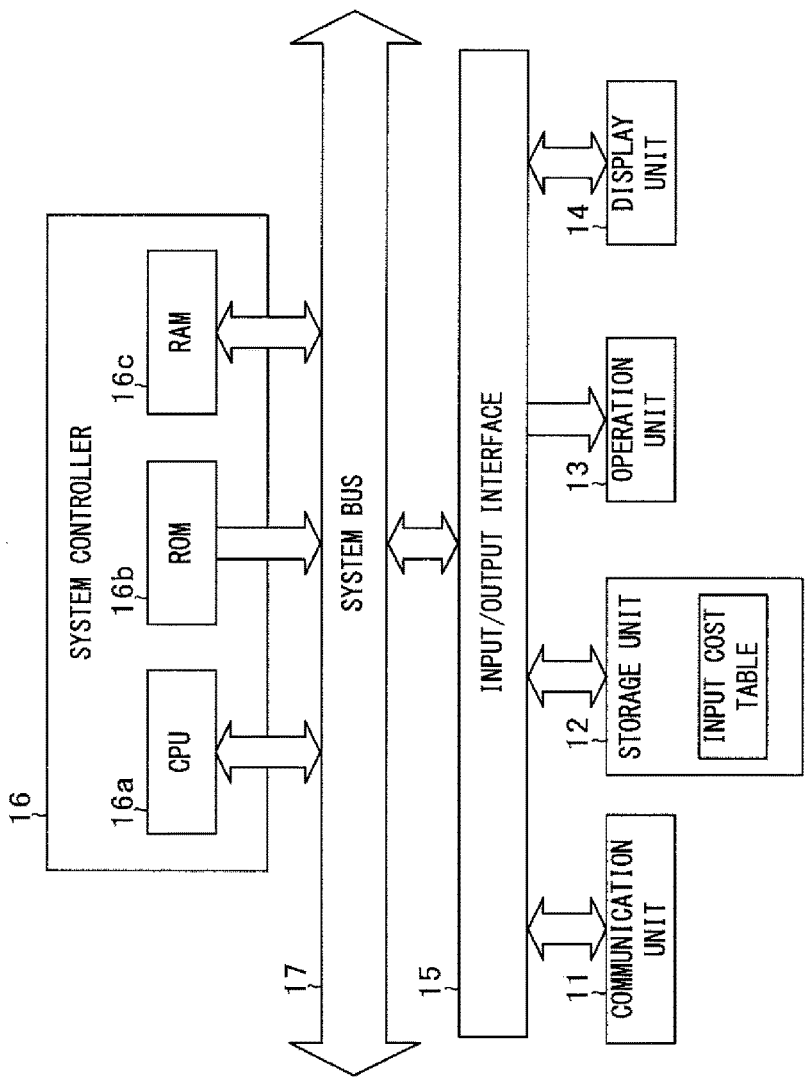
FIG. 2A is a block diagram illustrating an example of a schematic configuration of the authentication device 1 according to an embodiment.

Next, the configuration of the authentication device 1 will be described with reference to FIG. 2A. FIG. 2A is a block diagram illustrating an example of a schematic configuration of the authentication device 1 according to the embodiment. As illustrated in FIG. 2A, the authentication device 1 includes a communication unit 11, a storage unit 12, an operation unit 13, a display unit 14, an input/output interface 15, and a system controller 16. The system controller 16 and the input/output interface 15 can be connected to each other via a system bus 17.

The communication unit 11 is connected to the network NW and controls the state of communication with the user terminal 2 and the like. The storage unit 12 stores data and a program. Examples of the storage unit 12 include a hard disk drive and a flash memory. In the storage unit 12, for example, the user information DB 3 may be stored. In the storage unit 12, an input cost table is stored. The input cost table is information indicating a rule of determining an input cost of a character used for a password. Specifically, the input cost table is a table storing input costs of characters used for passwords. In the storage unit 12, the input cost table adapted to the input environment of the user terminal 2 is stored. In the input cost table, for example, an input cost is stored so as to be associated with at least a character or a character type which can be used for a password. A configuration example of the input cost table will be described later. In the storage unit 12, further, programs such as an operating system and an authentication process program are stored. The authentication process program is a program for performing a process relating to authentication of the user. The authentication process program is a program for determining propriety of a password which is registered or set. The authentication process program is an example of the information processing program in the present invention. Various programs may be obtained, for example, from another server device or the like via the network NW or may be recorded on a recording medium such as an optical disc and read via a drive device. The operation unit 13 receives an operation by an operator and outputs a signal corresponding to the operation to the system controller 16. Examples of the operation unit 13 include a key, a button, a switch, a keyboard, a mouse, a touch panel, and a remote controller. The authentication device 1 may not have the operation unit 13. For example, the authentication device 1 may be connected to the operation unit 13 via a wire or by radio. The display unit 14 displays information of an image, characters, and the like under control of the system controller 16. Examples of the display unit 14 include a liquid crystal display, a CRT display, and an LED. The authentication device 1 may not have the display unit 14. For example, the authentication device 1 may be connected to the display unit 14 by a wire or by radio. The input/output interface 15 performs an interface process between the communication unit 11 and the storage unit 12 and the system controller 16. The system controller 16 is constructed by a CPU (Central Processing Unit) 16a, a ROM (Read Only Memory) 16b, a RAM (Random Access Memory) 16c, and the like. The CPU 16a is an example of a processor. The present invention can be also applied to various processors different from the CPU. Each of the storage unit 12, the ROM 16b, and the RAM 16c is an example of a memory. The present invention can be applied also to various memories different from the hard disk, the ROM, and the RAM.

1-3. Outline of Functions of System Controller

Next, with reference to FIGS. 2B to 3B, outline of the functions of the system controller 16 will be described. FIG. 2B is a diagram illustrating an example of functional blocks of the system controller 16 of the authentication device 1 according to an embodiment. By reading and executing a program such as the authentication process program by the CPU 16a, as illustrated in FIG. 2B, the system controller 16 functions as a password obtaining unit 161, a character input cost obtaining unit 162, a password input cost calculating unit 163, a propriety determining unit 164, an output unit 165, and the like. The password obtaining unit 161 is an example of authentication information obtaining means in the present invention. The character input cost obtaining unit 162 is an example of cost obtaining means in the present invention. The password input cost calculating unit 163 is an example of calculating means in the present invention. The propriety determining unit 164 is an example of determining means in the present invention. The output unit 165 is an example of output means in the present invention.

The password obtaining unit 161 obtains a password conforming to a registration requirement. In the present embodiment, the password obtaining unit 161 obtains a password which is input by the user from the user terminal 2. For example, the password obtaining unit 161 makes the user terminal 2 display a registration information input screen. When the user enters a user ID and a password on the registration information input screen, the user terminal 2 transmits the user ID and the password to the authentication device 1. The password obtaining unit 161 determines, for example, whether the password received from the user terminal 2 satisfies the registration requirement or not. When the password does not satisfy the registration requirement, the password obtaining unit 161 makes the user terminal 2 display the password input screen again and urge the user to re-enter the password from the user terminal 2. For example, the user terminal 2 may determine whether the password satisfies the registration requirement or not. Only when the input password satisfies the registration requirement, the user terminal 2 may transmit the password to the authentication device 1.

The character input cost obtaining unit 162 obtains the input cost of each of a plurality of characters included in the password obtained by the password obtaining unit 161. Specifically, the character input cost obtaining unit 162 obtains the input cost corresponding to the input environment in the user terminal 2 from an input cost table. For example, the character input cost obtaining unit 162 obtains the input cost corresponding to an input character or character type from the input cost table. For example, the input cost of a character or a character type which is input next may change depending on the character or the characteristic type which is input just before. In this case, for example, the character input cost obtaining unit 162 obtains the input cost corresponding to the character or character type just before and corresponding to the next character or the character type from the input cost table.

The password input cost calculating unit 163 calculates the input cost of the password on the basis of the input costs obtained by the character input cost obtaining unit 162. For example, the password input cost calculating unit 163 may calculate the input cost of a password by adding input costs of a plurality of characters included in the password. Examples of calculation of the input environment, the input cost table, and the input cost of a password will be described later.

The propriety determining unit 164 determines the propriety of the password on the basis of the input cost calculated by the password input cost calculating unit 163. Specifically, when the input cost is equal to or larger than a predetermined lower limit value and is equal to or less than a predetermined upper limit value, the propriety determining unit 164 determines that the password is proper. On the other hand, when the input cost is less than the lower limit value or larger than the upper limit value, the propriety determining unit 164 determines that the password is not proper. The lower limit value and the upper limit value are stored in, for example, the storage unit 12. By the lower limit value and the upper limit value, the password input cost is kept to be proper. For example, the administrator of the information processing system S1 may determine the lower limit value and the upper limit value. For example, the propriety determining unit 164 may determine that a password is proper when the input cost is equal to or larger than the lower limit value and that a password is not improper only when the input cost is less than the lower limit value.

Figure 3A:
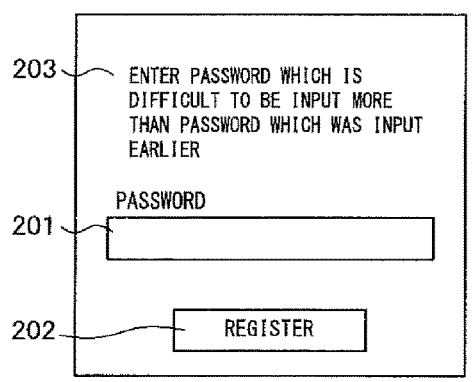
FIG. 3A is a diagram illustrating a display example of a password input screen in the case where an input cost is less than a lower limit value.
Figure 3B:
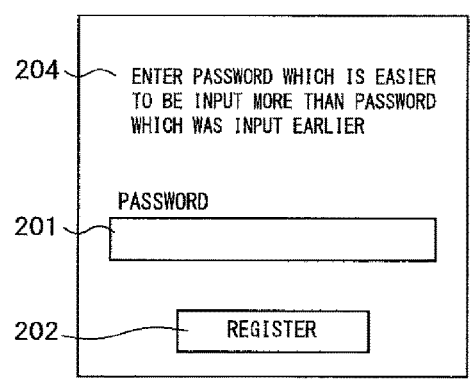
FIG. 3B is a diagram illustrating a display example of a password input screen in the case where the input cost is larger than an upper limit value.

When it is determined by the propriety determining unit 164 that the password is improper, the output unit 165 outputs information urging re-input of a password. For example, the output unit 165 cases the user terminal 2 to display a registration password re-input screen for re-inputting a password. FIG. 3A illustrates a display example of a password input screen in the case where the input cost is less than a lower limit value. As illustrated in FIG. 3A, on the registration password re-input screen, a password input field 201, a registration button 202, and a message 203 are displayed. The message 203 indicates that the input password is not proper. For example, the message 203 may be a message urging input of a password which is more difficult to input than a password which was input last time. FIG. 3B illustrates a display example of the password input screen in the case where the input cost is larger than the upper limit value. As illustrated in FIG. 3B, on the registration password re-input screen, the password input field 201, the registration button 202, and a message 204 are displayed. The message 204 indicates that the input password is not proper. The message 204 may be, for example, a message urging input of a password which is input easier than a password which was input last time. When the user inputs a password in the password input field 201 and selects the registration button 202 on the registration password re-input screen, the user terminal 2 transmits the input password to the authentication device 1. The system controller 16 calculates the input cost of the re-input password and determines the propriety of the password. The output unit 165 may not force the user to re-input a password even when the password is improper. For example, the output unit 165 may cause the message that the password is improper to be displayed on the user terminal 2 and allow the user to choose between registration of the input password and re-input of a password.

For example, each time the user inputs a character constructing a password, the system controller 16 may determine whether a password which is input at the time point satisfies the registration requirement or not or may determine propriety of a password which is input at the time point. In this case, for example, each time the propriety of a password is determined, the system controller 16 may display the determination result on the registration information input screen.

1-4. Examples of Input Cost Table and Calculation of Input Cost

Next, examples of the input cost table and calculation examples of the input cost will be described with reference to FIG. 4A to FIG. 7.

1-4-1. Input Environment in which Group of Input Devices can be Switched

There is a case that the input environment is an environment in which a group of input devices used for input can be switched among a plurality of groups of input devices and a plurality of inputtable characters are assigned to each group of input devices. In this case, an input cost table may store input costs based on the number of times of switching the group of input devices for inputting each of a plurality of characters included in a password. An input device may be, for example, a minimum component for inputting a character. For example, the input device may be a key, a button, a switch, and the like. The input device may be, for example, hardware or may be displayed on a screen in a software manner. One group of input devices includes, for example, a plurality of input devices to each of which one or more characters which can be input are assigned. The group of input devices may also include an input device to which no character is assigned. Examples of such an input device include a shift key, an escape key, and a function key. After an input device included in a certain group of input devices is operated, to operate another input device included in the same group of input devices, an operation for switching the group of input devices is unnecessary.

Figures 4A, 4B, 4C:
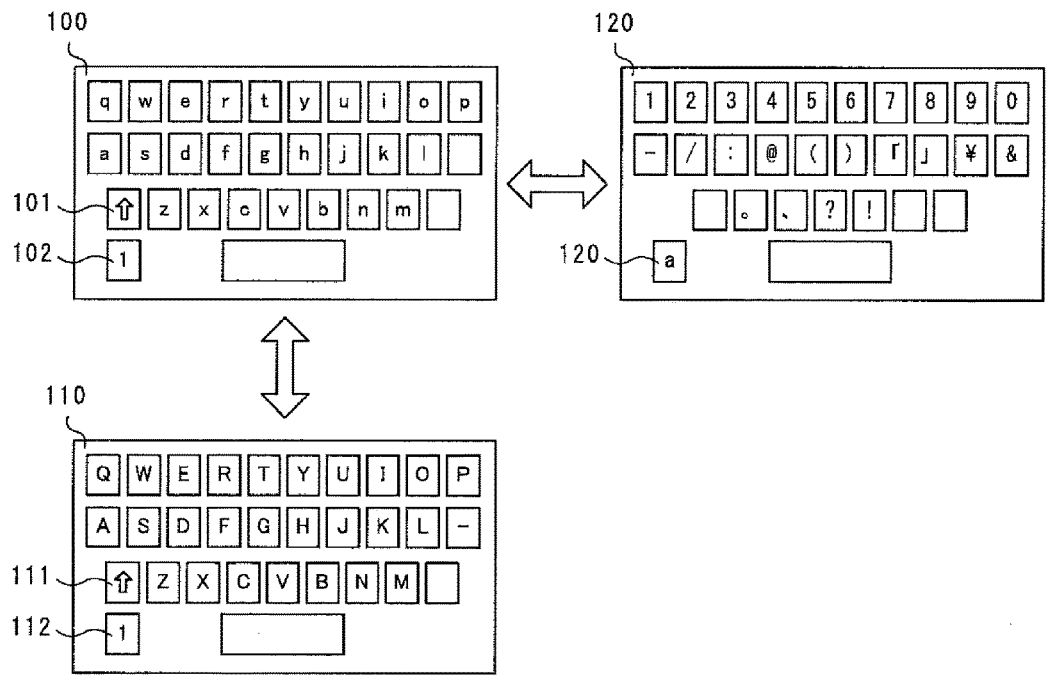
FIG. 4A is a diagram illustrating an example of an input environment in the case where a user terminal 2 is a predetermined smartphone.
FIG. 4B is a diagram illustrating an example of an input cost table in the case where the user terminal 2 is a predetermined smartphone.
FIG. 4C is a diagram illustrating an example of an input cost table in the case where the user terminal 2 is a predetermined smartphone.

FIG. 4A is a diagram illustrating an example of an input environment in the case where the user terminal 2 is a predetermined smartphone. For example, it is assumed that a certain smartphone displays a software keyboard on a screen. The software keyboard includes a plurality of keys. The software keyboard is an example of a group of input devices in the present invention. The user terminal 2 in this case can display, as a software keyboard, for example, as illustrated in FIG. 4A, a lowercase-character keyboard 100, an uppercase-character keyboard 110, and a numeric keyboard 120. Specifically, the user terminal 2 switches and displays a software keyboard used for input on the basis of an operation of the user. In the example of FIG. 4A, one character which can be input is basically assigned to each of keys of each of the software keyboards. At the start of input of a password, the user terminal 2 displays the lowercase-character keyboard 100. The lowercase-character keyboard 100 is a keyboard for inputting English lowercase characters. Therefore, the lowercase-character keyboard 100 includes a plurality of keys to which respective English lowercase characters are assigned. Further, the lowercase-character keyboard 100 includes switch keys 101 and 102. When the user pushes the switch key 101, the user terminal 2 switches the software keyboard to the uppercase-character keyboard 110. When the user pushes the switch key 102, the user terminal 2 switches the software board to the numeric keyboard 120. The uppercase-character keyboard 110 is a keyboard for inputting English uppercase characters. Therefore, the uppercase-character keyboard 110 includes a plurality of keys to which respective English uppercase characters are assigned. Further, the uppercase-character keyboard 110 includes switch keys 111 and 112. When the user pushes the switch key 111, the user terminal 2 switches the software keyboard to the lowercase-character keyboard 100. When the user pushes the switch key 112, the user terminal 2 switches the software keyboard to the numeric keyboard 120. When the user selects any key and inputs one uppercase character, the user terminal 2 switches the software keyboard to the lowercase-character keyboard 100. The numeric keyboard 120 is a keyboard for inputting a number and a sign. Therefore, the numeric keyboard 120 includes a plurality of keys to which respective numbers or signs are assigned. Further, the numeric keyboard 120 includes a switch key 121. When the user pushes the switch key 121, the user terminal 2 switches the software keyboard to the lowercase-character keyboard 100.

FIG. 4B is a diagram illustrating an example of an input cost table in the case where the user terminal 2 is a predetermined smartphone. When the software keyboard used for inputting a password can be switched, the input cost of each character changes according to a software keyboard used for inputting the character and a software keyboard used for inputting an immediately-preceding character. Specifically, the number of times of switching the software keyboard varies. Consequently, for example, in an input cost table, a cost according to the number of times of operations of switching the software keyboard to input a character is stored as the input cost of the character. In the case of the example of FIG. 4A, according to the character type of a character which is input just before and the character type of a character which is input next, the input cost of the next character changes. For example, as illustrated in FIG. 4B, the input cost table may be a two-dimensional array in which the input cost of a character type of a next character is stored so as to be associated with the character type of the immediately preceding character and the character type of the next character. In the example of FIG. 4B, immediately preceding character types correspond to rows and the next character types correspond to columns, but alternatively, the immediately preceding character types may correspond to columns and the next character types may correspond to rows. In the example of FIG. 4B, it is assumed that one operation of a key requires an input cost of 1. At the time of inputting the first character of a password, that is, when there is no immediately-preceding input character, the lowercase-character keyboard 100 is displayed on the screen. Therefore, in the case of inputting a lowercase character, it is sufficient for the user to perform an operation of pushing a desired key on the lowercase-character keyboard 100. Consequently, the input cost of the English lowercase character in this case is 1. On the other hand, in the case of inputting an English uppercase character or a number, the user has to operate the switch key 101 or 102 to switch the software keyboard and, then, select a desired key. Therefore, the input cost of each of the English uppercase character and the number is 2. When the immediately-preceding input character is a lowercase character, the lowercase-character keyboard 100 is displayed on the screen. Therefore, the input costs of the English lowercase character, the English uppercase character, and the number in this case are 1, 2, and 2, respectively. When the immediate-preceding input character is an uppercase character, when an uppercase character is input, the uppercase-character keyboard 110 is switched to the lowercase-character keyboard 100. Therefore, the input costs of the English lowercase character, the English uppercase character, and the number in this case are 1, 2, and 2, respectively. When the immediate-preceding input character is a number, the numeric keyboard 120 is displayed on the screen. Therefore, in the case of inputting a lowercase character, the user has to operate the switch key 121 to switch the software keyboard to the lowercase-character keyboard 100 and, then, select a desired key. Therefore, the input cost of the English lowercase character is 2. In the case of inputting an English uppercase character, the user has to operate the switch key 121 to switch the software keyboard to the English lowercase-character keyboard 100, further operate the switch key 101 to switch the software keyboard to the English uppercase-character keyboard 110, and then select a desired key. Consequently, the input cost of the English uppercase character is 3. The input cost of a number is 1.

For example, it is assumed that a password is "oJ3X70c". In this case, the input costs of the characters from "o" to "c" are 1, 2, 2, 3, 2, 1, and 2, respectively. Therefore, the input cost of the password is 13.

FIG. 4C is a diagram illustrating another example of the input cost table in the case where the user terminal 2 is a predetermined smartphone. As illustrated in FIG. 4C, in the input cost table, an input cost may be stored so as to be associated with an immediately-preceding input character and a character which is input next. The input cost of a password is the same in any of the input cost tables of FIGS. 4B and 4C.

1-4-2. Input Environment in which the Number of Operating Times Varies Depending on Characters There is a case that the input environment is an environment in which the number of times of operating an input device varies depending on an input character. In this case, the input cost table may store an input cost based on the number of times of operating to input each of a plurality of characters included in a password. Examples of operations for inputting a character include an operation of pressing an input device and an operation of moving the input device. Examples of the operation of an input device displayed on the screen include an operation of pressing the input device with a finger or a pen, an operation of sliding the pressed finger or pen, an operation of detaching the pressed finger or pen, tapping, clicking, and dragging.

Figures 5A, 5B:
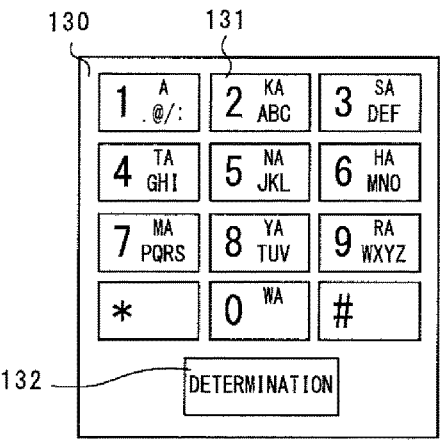
FIG. 5A is a diagram illustrating an example of an input environment in the case where the user terminal 2 is a predetermined cellular phone.
FIG. 5B is a diagram illustrating an example of an input cost table in the case where the user terminal 2 is a predetermined cellular phone.

FIG. 5A is a diagram illustrating an example of an input environment in the case where the user terminal 2 is a predetermined cellular phone. A certain cellular phone has a plurality of keys for inputting a character. For example, the user terminal 2 has an operation unit 130 as illustrated in FIG. 5A. For example, a software keyboard as illustrated in FIG. 5A may be displayed on the screen. The operation unit 130 includes a plurality of keys to each of which a plurality of characters are assigned. In the operation unit 130, an input character varies according to the number of times the user continuously pushes the same key. Further, the operation unit 130 includes a determination key 132. The determination key 132 is a key for determining a character input. For example, each time the user pushes keys 131 of the operation unit 130, the input character changes like "a", "b", "c", "A", "B", "C", and "2". When the user pushes the determination key 132 or a key different from the keys 131, the input is determined.

FIG. 5B is a diagram illustrating an example of an input cost table in the case where the user terminal 2 is a predetermined cellular phone. In the case of the example of FIG. 5A, the number of times of input operations varies depending on characters. For example, the number of times of operations for inputting "a" is one, and the number of times of operations for inputting "2" is seven. The larger the number of times of operations is, the higher the input cost is. When a key of the immediately preceding character and a key of the next character are the same, the user has to push the determination key 132 for determining the immediately preceding character. Consequently, the number of times of input operations varies also depending on the key of the immediately preceding character and the key of the next character. In the input cost table, as illustrated in FIG. 5B, the input cost of the next character according to the number of times of input operations is stored in association with the immediately preceding character and the next character. In the example of FIG. 5B, it is assumed that the input cost of 1 is required per operation of a key. For example, the cost for inputting "a" as the first character of a password is 1. The input cost of "2" is 7. When the immediately preceding character is "a", the cost for inputting "a" next is 2. When the immediately preceding character is "a", the cost for inputting "d" next is 1.

For example, it is assumed that a password is "cBx9y6". In this case, the input costs of the characters from "c" to "6" are 3, 5, 2, 10, 4, and 7, respectively. Therefore, the input cost of the password is 31.

Figures 6A, 6B:
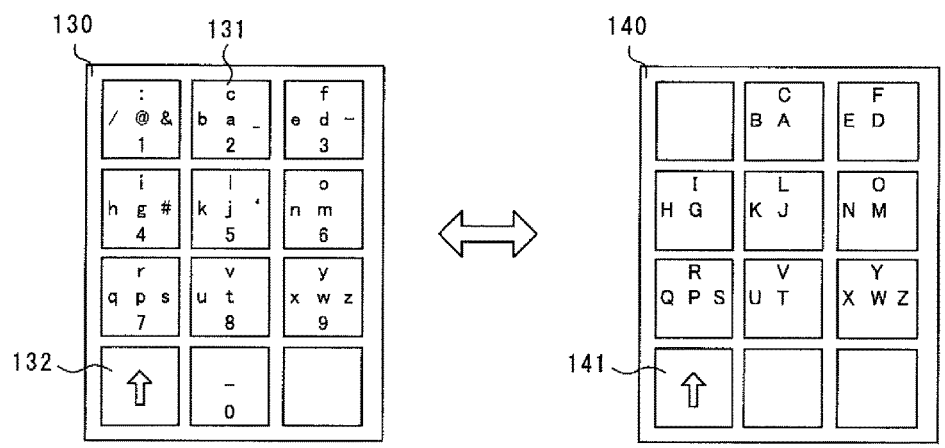
FIG. 6A is a diagram illustrating an example of an input environment in the case where the user terminal 2 is a smartphone enabling a flick input.
FIG. 6B is a diagram illustrating an example of an input cost table in the case where the user terminal 2 is a smartphone in which a flick input is possible.

FIG. 6A is a diagram illustrating an example of an input environment in the case where the user terminal 2 is a smartphone enabling a flick input. It is assumed that, for example, another smartphone displays a software keyboard enabling a flick input on the screen. The user terminal 2 in this case can display, for example, as illustrated in FIG. 6A, a lowercase/numeric character keyboard 130 and an uppercase-character keyboard 140 as software keyboards. A plurality of characters are assigned to each of the character keys of the lowercase/numeric character keyboard 130 and the uppercase-character keyboard 140. The lowercase/numeric character keyboard 130 is a keyboard for inputting English lowercase characters and numbers. For example, when the user taps keys 131 in the lowercase/numeric character keyboard 130, "a" is input. Tap is an operation of hitting a key lightly with a finger. When the user flicks the key 131, a character different from "a" is input. Flick is an operation of pushing a key with a finger and moving the pushed finger in any direction. For example, when the user moves the finger to the left, "b" is input. When the user moves the finger upward, "c" is input. When the user moves the finger downward, "2" is input. The lowercase/numeric character keyboard 130 also includes a switch key 132. When the user pushes the switch key 132, the user terminal 2 switches the software keyboard to the uppercase-character keyboard 140. The uppercase-character keyboard 140 is a keyboard for inputting English uppercase characters. Also in the uppercase-character keyboard 140, operations similar to those in the lowercase/numeric character keyboard 130 can be performed. The uppercase-character keyboard 140 further includes a switch key 141. When the user pushes the switch key 141, the user terminal 2 switches the software keyboard to the lowercase/numeric character keyboard 130.

FIG. 6B is a diagram illustrating an example of an input cost table in the case where the user terminal 2 is a smartphone enabling a flick input. If a flick input is possible, the number of times of operations varies depending on characters. Specifically, in the case of tap, it is sufficient for the user to perform an operation of pushing a key for a moment. That is, the tap includes only one operation. On the other hand, in the case of flick, the user has to perform an operation of pushing a key and an operation of moving the pushed finger. That is, the flick includes two operations. The larger the number of times of operations is, the higher the input cost is. Whether the software keyboard switching operation is necessary or not varies according to the character type of the immediate preceding character and the character type of the next character. Consequently, for example, as illustrated in FIG. 6B, in the input cost table, the input cost of the next character may be stored so as to be associated with the character type of the immediately preceding character and the next character. For example, when the software keyboard switching operation is unnecessary, the input cost of a character which is input by a tap is 1, and the input cost of a character which is input by a flick is 2. When the software keyboard switching operation is necessary, the input cost of a character which is input by a tap is 2, and the input cost of a character which is input by a flick is 3.

For example, it is assumed that the password is "jZx9ra". In this case, the input costs of the characters from "j" to "a" are 1, 3, 3, 2, 2, and 1, respectively. Therefore, the input cost of the password is 12.

For example, when a multi-byte character is allowed as a character used for a password, generally, the number of times of operations varies among characters. For example, it is assumed that a multi-byte character is input by a keyboard of the QWERTY layout. In this case, to input "あ", the key "a" has to be pushed. To input "か", the keys "k" and "a" have to be pushed. To enter "ぃ", the key "a" is pushed and, after that, the space key has to be pushed once or more. Consequently, the input cost table may have, for example, a one-dimensional array storing an input cost according to the number of times of operation so as to be associated with a multi-byte character.

1-4-3. Input Environment in which Input Load Varies Depending on Position of Input Device There is a case that the input environment is an environment in which the input load of a character varies depending on a position of an input device among a group of input devices or layout of a plurality of input devices. In this case, the input cost table may store an input cost based on the position of the input device for inputting each of a plurality of characters included in a password.

FIG. 7 is a diagram illustrating an example of an input cost table in the case where the user terminal 2 is a personal computer. In a personal computer, generally, a keyboard of the QWERTY layout is used. In the case of such a keyboard, generally, the user inputs characters by using the fingers of both hands. On the basis of the key layout, the correspondences of fingers and keys are determined. For example, in such a case, the input cost may change according to the position of a key to which a character is assigned. For example, when the user continuously pushes different keys with the same finger, the input cost is higher than the case where the user continuously pushes different keys with different fingers. For example, when the user inputs "q" after "a", the input operation of the user is more difficult than in the case of inputting "r" after "a". Consequently, as illustrated in FIG. 7, the input cost of the next character according to the layout of a key to which the immediately preceding character is assigned and a key to which the next character is assigned is stored so as to be associated with the immediately preceding character and the next character. For example, when a key to which the immediately preceding character is assigned and a key to which the next character is assigned are different keys pushed with the same finger, the input cost is higher by 0.5 as compared with the case that keys are pushed with different fingers. For example, when the immediately preceding character is "c", the cost of inputting "c" is 1, while when the immediately preceding character is "d" and the cost of inputting "c" next is 1.5. In the case of such a keyboard, the number of times of operations of pushing a key varies depending on characters. For example, English lowercase characters and numbers can be input only by pushing a character key once. On the other hand, in the case of English uppercase characters, it is necessary to push both a shift key and a character key. That is, operations of twice are necessary. Therefore, the number of times of operations of a key varies depending on characters. For example, the cost of inputting "A" next in the case where the immediately preceding character is "a" is 2. The cost of inputting "A" next in the case where the immediately preceding character is "H" is also 2. On the other hand, the cost of inputting "A" next in the case where the immediately preceding character is "A" is 1. The reason is that the shift key may be continuously pushed in this case.

For example, it is assumed that the password is "Np4dMu7". In this case, the input costs of characters from "N" to "7" are 2, 1, 1, 1, 2, 1.5, and 1.5, respectively. Therefore, the input cost of the password is 10.

The input costs based on the positions of keys are not limited to the above-described examples. For example, the input cost may be determined on the basis of the distance between the key of the immediately preceding character and the key of the next character. For example, when the user pushes a key disposed in the periphery of a key which is pushed just before, the user has to move the finger finely. When the key of the next character is adjacent to the key of the immediately preceding character, the input cost may be higher than that when it is not adjacent. For example, the input cost may be determined on the basis of a hand operating the key of the immediately preceding character and a hand operating the key of the next character. For example, it is more difficult to push keys continuously by the same hand than to push keys alternately by both hands. Consequently, when the key of the immediately preceding character and the key of the next character are operated by the same hand, the input cost may be higher than the case where keys are operated by different hands. The input cost may be determined on the basis of fingers assigned to keys. For example, generally, it is more difficult to operate keys with a little finger than with an index finger. Therefore, for example, the input costs of "1", "q", "a", and "z" may be higher than those of "4", "r", "f", and "v". For example, there is a case that the input load of a character depending on the positions of keys varies among individuals. Consequently, the authentication device 1 may be configured so that a determination criterion of the input cost can be set by the user. In this case, for example, a plurality of input cost tables may be preliminarily stored in the storage unit 12. The character input cost obtaining unit 162 may obtain the input cost by using an input cost table corresponding to a setting of the user.

The above-described values of the input costs are examples. As long as the input cost is based on the load of a character input operation, values different from the above-described examples may be stored in an input cost table. For example, in the case the immediately preceding input character does not affect input cost of the next character, the input cost table may be a one-dimensional array storing an input cost so as to be associated with an input character. The present invention can be applied also to various input environments other than the above-described input environments. In this case, the input cost table according to the input environment is stored in the storage unit 12.

1-5. Operation of Information Processing System

Figure 8:
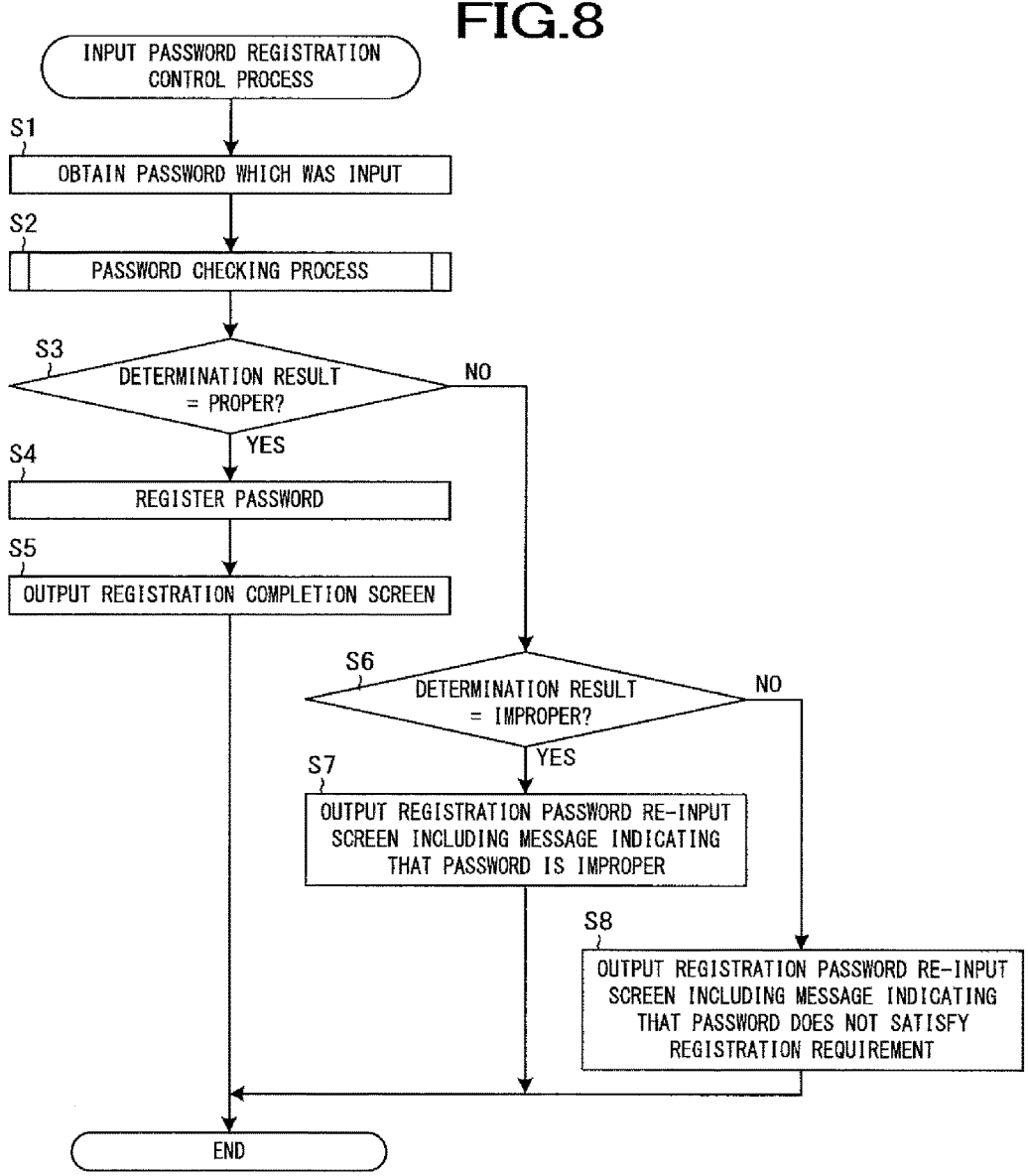
FIG. 8 is a flowchart illustrating an example of an input password register control process of a system controller 16 of the authentication device 1 according to an embodiment.

Next, the operation of the information processing system S1 will be described with reference to FIGS. 8 to 10. FIG. 8 is a flowchart illustrating an example of an input password registration control process of the system controller 16 in the authentication device 1 according to the embodiment. When the user inputs a user ID and a password on a registration information input screen, the user terminal 2 transmits a password registration request including the input user ID and password to the authentication device 1. On reception of the password registration request, the system controller 16 starts the input password registration control process. As illustrated in FIG. 8, the password obtaining unit 161 obtains the input user ID and password from the password registration request (step S1).

Subsequently, the system controller 16 executes a password checking process (step S2). In the password checking process, the system controller 16 determines whether the input password satisfies a registration requirement or not. The system controller 16 also determines propriety of the password on the basis of the input cost of the password. FIG. 9 is a flowchart illustrating an example of an input password checking process of the system controller 16 of the authentication device 1 according to the embodiment. As illustrated in FIG. 9, the password obtaining unit 161 determines whether the input password satisfies the registration requirement or not (step S11). When it is determined that the password does not satisfy the registration requirement (step S11: NO), the password obtaining unit 161 proceeds to step S12. In step S12, the password obtaining unit 161 sets a determination result in the password checking process to "registration requirement violation" and finishes the input password checking process. On the other hand, when it is determined that the password satisfies the registration requirement (step S11: YES), the password obtaining unit 161 proceeds to step S13.

In step S13, the system controller 16 executes an input cost calculating process. FIG. 10 is a flowchart illustrating an example of an input cost calculating process of the system controller 16 of the authentication device 1 according to the embodiment. As illustrated in FIG. 10, the password input cost calculating unit 163 sets a position number "i" to 1. The password input cost calculating unit 163 sets the input cost of the password to 0 (step S21). Subsequently, the character input cost obtaining unit 162 determines whether the position number "i" is 1 or not (step S22). When it is determined that the position number "i" is 1 (step S22: YES), the character input cost obtaining unit 162 proceeds to step S23. In step S23, the character input cost obtaining unit 162 sets the immediately preceding character as "not applicable" and proceeds to step S25. On the other hand, when it is determined that the position number "i" is not 1 (step S22: NO), the character input cost obtaining unit 162 proceeds to step S24. In step S24, the character input cost obtaining unit 162 obtains the i−1th character from the input password. The character input cost obtaining unit 162 sets the immediately preceding character to the i−1th character. Subsequently, the character input cost obtaining unit 162 proceeds to step S25.

In step S25, the character input cost obtaining unit 162 obtains the i-th character from the input password. The character input cost obtaining unit 162 sets the next character to the i-th character. Subsequently, the character input cost obtaining unit 162 obtains, as an input cost of the next character, an input cost corresponding to the immediately preceding character or the character type of the immediately preceding character and the next character or the character type of the next character from the input cost table (step S26). After that, the password input cost calculating unit 163 adds the input cost obtained from the input cost table to the input cost of the password (step S27).

Subsequently, the password input cost calculating unit 163 determines whether the position number "i" is less than the value of the number of characters of the input password or not (step S28). When it is determined that the position number "i" is less than the value of the number of characters of the password (step S28: YES), the password input cost calculating unit 163 proceeds to step S29. In step S29, the password input cost calculating unit 163 adds 1 to the position number "i" and proceeds to step S22. On the other hand, when it is determined that the position number "i" is not less than the value of the number of characters of the password (step S28: NO), the password input cost calculating unit 163 finishes the input cost calculating process.

Figure 9:
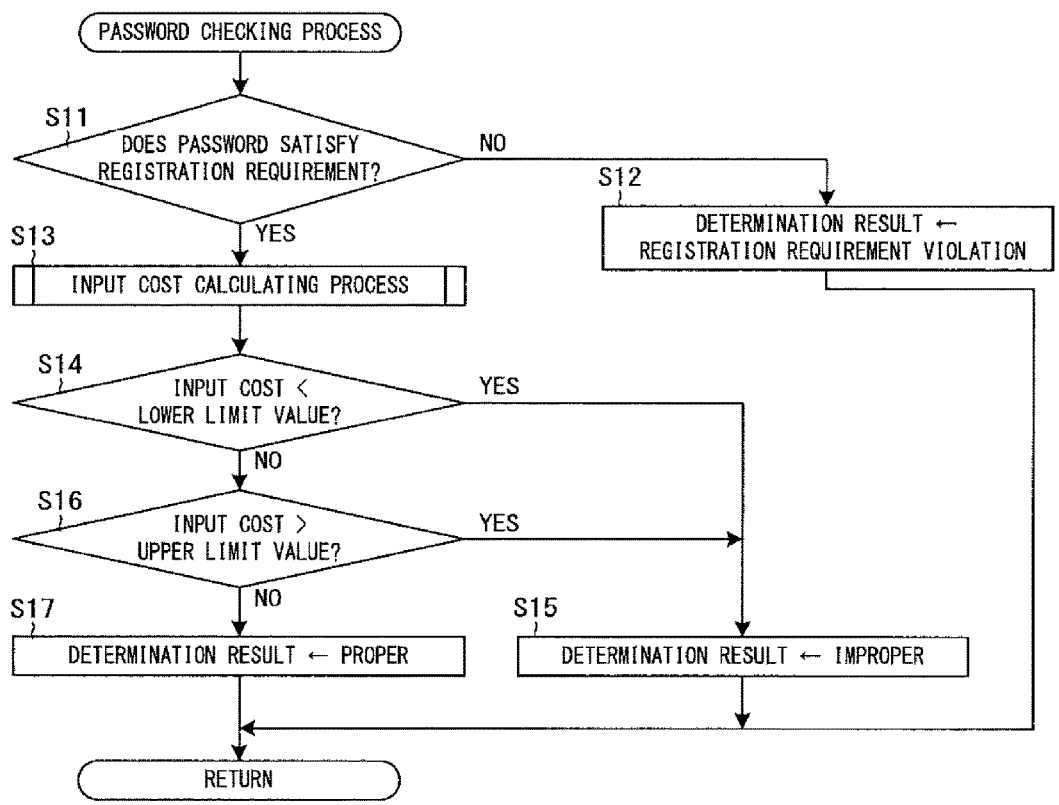
FIG. 9 is a flowchart illustrating an example of an input password checking process of the system controller 16 of the authentication device 1 according to an embodiment.

After completion of the input cost calculating process, as illustrated in FIG. 9, the propriety determining unit 164 determines whether the input cost of a password is less than the lower limit value or not (step S14). When it is determined that the input cost is less than the lower limit value (step S14: YES), the propriety determining unit 164 proceeds to step S15. In step S15, the propriety determining unit 164 sets the determination result to "improperness" and finishes the password checking process. On the other hand, when it is determined that the input cost is not less than the lower limit value (step S14: NO), the propriety determining unit 164 proceeds to step S16.

In step S16, the propriety determining unit 164 determines whether the input cost of a password is higher than the upper limit value or not. When it is determined that the input cost is higher than the upper limit value (step S16: YES), the propriety determining unit 164 proceeds to step S15. On the other hand, when it is determined that the input cost is not higher than the upper limit value (step S16: NO), the propriety determining unit 164 proceeds to step S17. In step S17, the propriety determining unit 164 sets the determination result to "proper" and finishes the password checking process.

When the password checking process is finished, as illustrated in FIG. 8, the output unit 165 determines whether the determination result is set as "proper" or not (step S3). When it is determined that the determination result is set as "proper" (step S3: YES), the output unit 165 proceeds to step S4. In step S4, the output unit 165 registers the input user ID and password so as to be associated with each other in the user information DB 3. Subsequently, the output unit 165 outputs a web page of a registration completion screen to the user terminal 2 (step S5) and finishes the input password registration control process. On the basis of the web page received from the authentication device 1, the user terminal displays the registration completion screen. The registration completion screen indicates that the input password is proper. For example, on the registration completion screen, a message that registration of the user ID and the password has been completed is displayed.

In step S3, when it is determined that the determination result is not set as "proper" (step S3: NO), the output unit 165 proceeds to step S6. In step S6, the output unit 165 determines whether the determination result is set as "improper" or not. When it is determined that the determination result is set as "improper" (step S6: YES), the output unit 165 proceeds to step S7. In step S7, the output unit 165 outputs a web page of the registration password re-input screen indicating that the password is improper to the user terminal 2, and finishes the input password registration control process. On the basis of the received web page, the user terminal 2 displays the registration password re-input screen as illustrated in FIG. 3A or 3B.

On the other hand, when it is determined that the determination result is not set as "improper" (step S6: NO), the output unit 165 proceeds to step S8. In step S8, the output unit 165 outputs the web page of the registration password re-input screen indicating the password does not satisfy the registration requirement to the user terminal 2, and finishes the input password registration control process.

1-6. Case where Authentication Device is Applied to Terminal Device

Figure 1B:
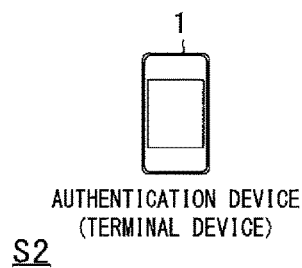
FIG. 1B is a diagram illustrating an example of a schematic configuration of an information processing system S2 in the case of applying the authentication device 1 to a terminal device.

Next, the case where the authentication device 1 is applied to a terminal device will be described with reference to FIG. 1B. FIG. 1B is a diagram illustrating an example of a schematic configuration of an information processing system S2 in the case of applying the authentication device 1 to a terminal device. As illustrated in FIG. 1B, the information processing system S2 includes the authentication device 1 as a terminal device. The authentication device 1 in this case may be, for example, connectable to a network. Two or more authentication devices 1 may exist. The authentication device 1 may be, for example, a smartphone, a tablet computer, a cellular phone, a personal computer, a PDA, an STB, or the like. The authentication device 1 is used by a user.

For example, the authentication device 1 may be configured so that a password for using the authentication device 1 can be set by the user. The authentication device 1 may be also configured so that the user can change a set password. In the present embodiment, the input environment of a password in the authentication device 1 is single. In the storage unit 12, an input cost table corresponding to the input environment is stored. On the basis of the input cost table, the authentication device 1 calculates the input cost of an input password and determines propriety of the password.

Figure 10:
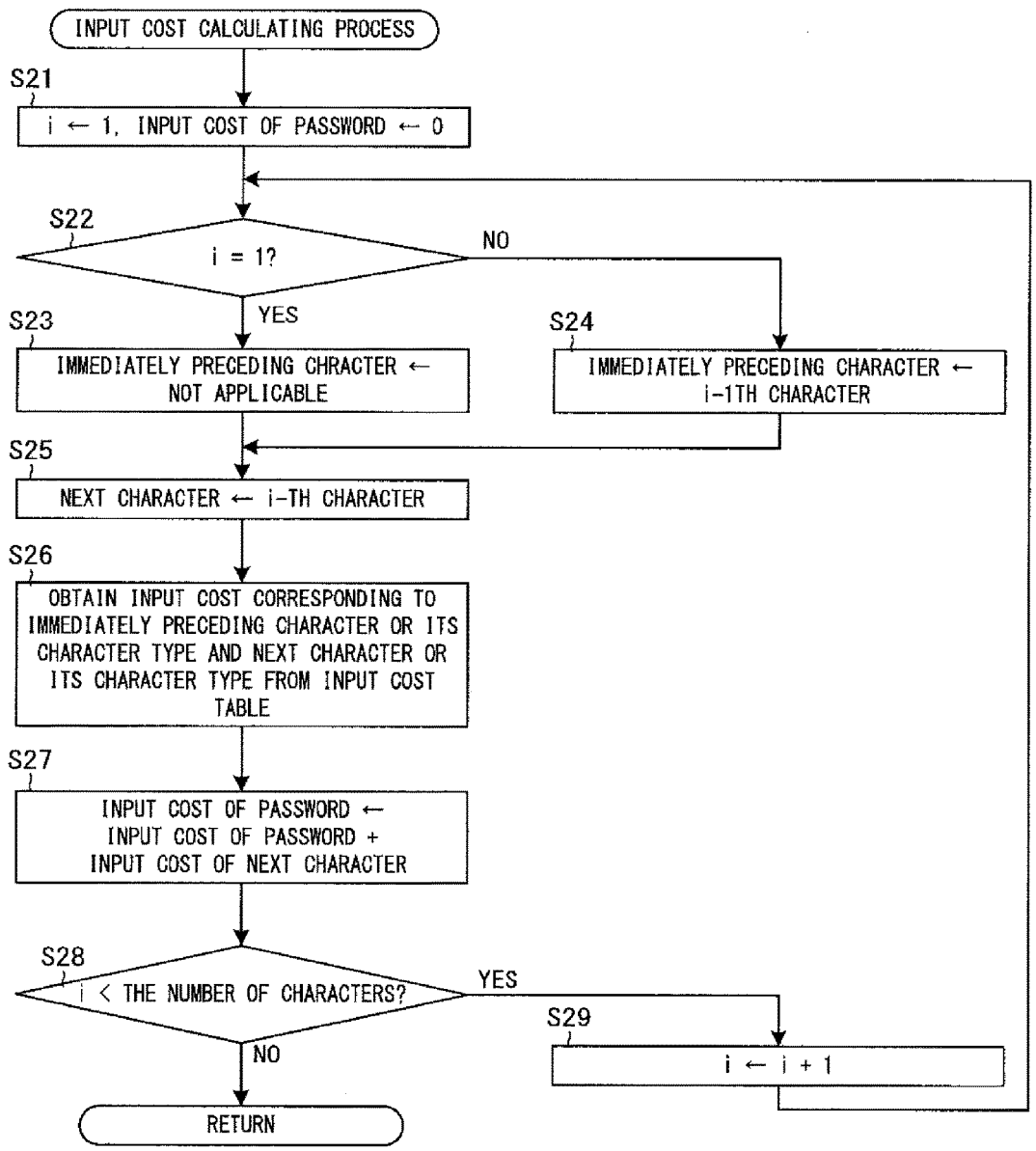
FIG. 10 is a flowchart illustrating an example of an input cost calculating process of the system controller 16 of the authentication device 1 according to an embodiment.

Processes in the case where the authentication device 1 is a terminal device are basically the same as those illustrated in the flowcharts of FIGS. 8 to 10. In the input password registration control process illustrated in FIG. 8, the output unit 165 obtains a password which is input by use of the operation unit 13. When it is determined that the password is proper, the output unit 165 stores the password into the storage unit 12. The output unit 165 outputs screens, such as the registration completion screen and the registration password re-input screen, to the display unit 14.

As described above, according to the present embodiment, the system controller 16 obtains a password according to a predetermined registration requirement. The system controller 16 obtains the cost of an input operation of each of a plurality of characters included in the password. The system controller 16 calculates the input cost of the password on the basis of the obtained costs. The system controller 16 determines propriety of the password on the basis of the calculated input cost. Therefore, while assuring safety on the basis of the propriety determination result, the input load of the password can be maintained properly.

The system controller 16 may obtain a cost based on the number of times of switching a group of input devices for inputting each of a plurality of characters included in a password. In this case, the input cost proper to an input environment in which the operation of switching the group of input devices can be performed can be calculated.

The system controller 16 may obtain a cost based on the number of times of operations for inputting each of a plurality of characters included in a password. In this case, the input cost proper to an input environment in which the number of times of operations varies depending on characters can be calculated.

The system controller 16 may obtain a cost based on the position of the input device to which each of a plurality of characters included in a password is assigned. In this case, the input cost proper to the input environment in which the input load varies depending on the position of the input device can be calculated.

The system controller 16 may obtain a password which is input by the user operation and output propriety determined for the obtained password. In this case, the input load of the password input by the user can be maintained properly.

2. Second Embodiment

Next, a second embodiment will be described with reference to FIG. 11. In the first embodiment, the input environment of a password is limited to one. In the second embodiment, a plurality of input environments exist. Also in the present embodiment, the authentication device 1 may be, for example, a server device or a terminal device. Except for the points to be described below, the second embodiment is basically the same as the first embodiment.

When the authentication device 1 is a server device, as the user terminal 2 in the information processing system S1, a plurality of types of terminal devices can use the information processing system S1. There is a case that the input environment varies depending on the type of the user terminal 2.

The character input cost obtaining unit 162 specifies the input environment actually used to input a password from a plurality of input environments. For example, when the authentication device 1 and the user terminal 2 communicate with the HTTP, the character input cost obtaining unit 162 may use user agent information included in a request from the user terminal 2. In this case, the authentication device 1 specifies the input environment corresponding to the user agent information.

The input environment may vary in the user terminals 2 of the same type or in the same user terminal 2. For example, there is a user terminal 2 that enables user to switch the input environment. For example, when the user terminal 2 displays a group of input devices such as a software keyboard on the screen, there is a case that by switching of the input environment, a way of character input, layout and/or type of a group of input devices, a way of switching a group of input devices, and the like vary. In such a case, for example, the character input cost obtaining unit 162 may request information of the present input environment to the user terminal 2. In response to the request, the user terminal 2 transmits, for example, an input environment ID indicating the present input environment to the authentication device 1. By receiving the input environment ID, the character input cost obtaining unit 162 specifies the input environment of the user terminal 2.

When the authentication device 1 is a terminal device, like the user terminal 2, there is the case that the input environment in the authentication device 1 can be switched. In this case, for example, information indicating the present input environment is stored in the storage unit 12. The character input cost obtaining unit 162 specifies the input environment in the authentication device 1 on the basis of the information.

In the storage unit 12, a plurality of input cost tables are stored. Each input cost table is, for example, stored so as to be associated with an input environment ID indicating the input environment corresponding to the input cost table. In the storage unit 12, a user agent/input environment conversion table may be stored. The user agent/input environment conversion table is a table in which user agent information and an input environment ID corresponding to the type of the user terminal 2 indicated by the user agent information are stored so as to be associated with each other.

FIG. 11 is a flowchart illustrating an example of the input cost calculating process of the system controller 16 of the authentication device 1 according to the embodiment. In FIG. 11, the same reference signs are designated to processes that is the same as those in FIG. 10. As illustrated in FIG. 11, the character input cost obtaining unit 162 specifies a password input environment (step S31). When the authentication device 1 is a server device, the character input cost obtaining unit 162 may obtain, for example, user agent information from a registration request received from the user terminal 2. In this case, the character input cost obtaining unit 162 obtains the input environment ID corresponding to the user agent information from the user agent/input environment conversion table. For example, the character input cost obtaining unit 162 may transmit a request for an input environment ID to the user terminal 2 which transmitted the registration request. In response to the request, the user terminal 2 transmits the input environment ID indicating the present input environment to the authentication device 1. When the authentication device 1 is a terminal device, the character input cost obtaining unit 162 may obtain, for example, information indicating the present input environment from the storage unit 12. The character input cost obtaining unit 162 may obtain an input environment ID corresponding to the obtained information.

After step S31, the character input cost obtaining unit 162 determines an input cost table corresponding to the input environment (step S32). Specifically, the character input cost obtaining unit 162 specifies the input cost table corresponding to the obtained input environment ID from the storage unit 12. Subsequently, the system controller 16 executes S21 to S25. After that, the character input cost obtaining unit 162 obtains, as the input cost of the next character code, the input cost corresponding to an immediately preceding character or the character type of the immediately preceding character and the next character or the character type of the next character from the input cost table determined in step S32 (step S33). Subsequently, the system controller 16 executes the steps S27 to S29.

As described above, according to the present embodiment, the system controller 16 specifies an input environment used to input a password and obtains an input cost of a character included in a password on the basis of an input cost table corresponding to the specified input environment. Therefore, even when the input environment is not determined in advance, the input cost proper to the input environment used to input a password can be calculated.

3. Third Embodiment

Next, a third embodiment will be described with reference to FIGS. 12A to 14. In the present embodiment, when it is determined that an input password is not proper, the authentication device 1 outputs an instruction on how to correct the password so that the password is determined to be proper. By this operation, the load of registering or setting a password by the user can be lessened. Also in the present embodiment, the authentication device 1 may be, for example, a server device or a terminal device. Except for the points to be described below, the third embodiment is basically the same as the first or second embodiment.

When it is determined by the propriety determining unit 164 that an input password is not proper, the output unit 165 determines how to correct the input password. Correction of a password may be, for example, change, deletion, or replacement of a part of a password, addition of a character to the password, or the like. By such a correction, the output unit 165 generates or obtains a password which is determined to be proper by the propriety determining unit 164. The output unit 165 causes the instruction on how to correct a password determined to be proper by the propriety determining unit 164 to be displayed on the registration password re-input screen. For example, the correction instruction may be displayed as a proposal or correction example to the user. The user in this case does not always correct a password according to the displayed correction instruction. Hereinbelow, password correction examples will be described. In the following examples, for convenience of explanation, it is assumed that the input cost is calculated on the basis of the input cost table illustrated in FIG. 4B.

Figure 12A:
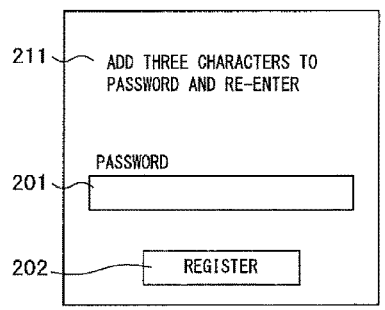
FIG. 12A illustrates a display example of a registration password re-input screen.
Figure 12B:
FIG. 12B illustrates an example of correction of a password by the user.

First, a correction example in the case where the input cost of a password is less than the lower limit value will be described. It is assumed that when the user inputs "dAJ395a0" as a password first, the input cost is less than the lower limit value. The output unit 165 may output, for example, as the correction instruction, the number of characters added to a password. By the number of characters, a minimum value of an additional input cost is determined. For example, the output unit 165 may determine the number of characters to be added on the basis of the difference between the input cost of a password before correction and the lower limit value. FIG. 12A illustrates a display example of a registration password re-input screen. On the registration password re-input screen illustrated in FIG. 12A, a message 211 urging addition of three characters to the password is displayed. FIG. 12B illustrates an example of correction of a password by the user. The user who sees the message 211 adds three characters to the password which was input before. By the addition, the input cost increases by three or more. In the example of FIG. 12B, "1yz" are added after "dAJ395a0". Therefore, the input cost increases by 4.

Figure 12C:
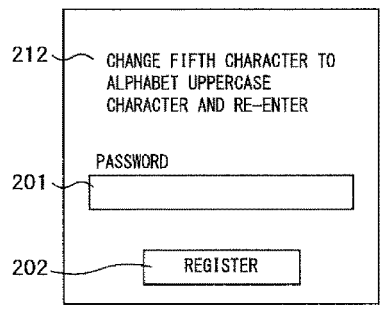
FIG. 12C illustrates a display example of a registration password re-input screen.
Figure 12D:
FIG. 12D illustrates an example of correction of a password by the user.

There is a case that the input cost changes depending on the character type. In this case, the output unit 165 may output, for example, as the correction instruction, an instruction to change a character as a part of a password to a character of a character type different from that of the aforementioned character. For example, the output unit 165 may specify a character of a character type whose input cost is relatively low from a password and specify a character type whose input cost is higher than the specified character type. At this time, the output unit 165 may specify, for example, a character to be changed and a character type after a change on the basis of the difference between the input cost of a password before correction and the lower limit value. The output unit 165 may output the specified result as the correction instruction. FIG. 12C illustrates a display example of a registration password re-input screen. In the registration password re-input screen illustrated in FIG. 12C, a message 212 urging to change "9" (the fifth character) included in the password to an English uppercase character is displayed. FIG. 12D illustrates an example of correction of the password by the user. The user who sees the message 212 changes, for example, as illustrated in FIG. 12D, "9" in the password to "P". In the password before the correction, the input cost of "95" is 2. In the password after the correction, the input cost of "P5" is 5. Therefore, the input cost increases by 3. The output unit 165 may output, for example, a instruction to change two or more characters.

Figure 12E:
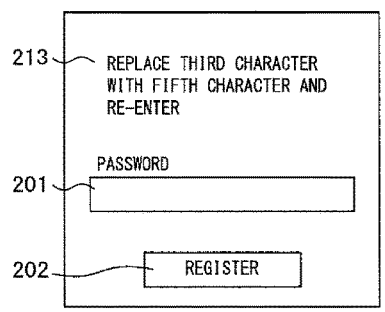
FIG. 12E illustrates a display example of a registration password re-input screen.
Figure 12F:
FIG. 12F illustrates an example of correction of a password by the user.

There is a case that the input cost of a character which is input next varies depending on an immediately preceding input character or the character type of this character. In this case, the output unit 165 may output, for example, as a correction instruction, an instruction to replace a character with another character in the password. For example, by performing replacement, the output unit 165 may specify two characters whose input cost is higher than that before the replacement. At this time, for example, on the basis of the difference between the input cost of a password before correction and the lower limit value, the output unit 165 may specify a character to be replaced. The output unit 165 may output the specified result as the correction instruction. FIG. 12E illustrates a display example of the registration password re-input screen. On the registration password re-input screen illustrated in FIG. 12E, a message 213 urging to replace "J" with "9" included in the password is displayed. FIG. 12F illustrates an example of correction of the password by the user. The user who sees the message 213 replaces, for example, the position of "J" with the position of "9" in the password as illustrated in FIG. 12F. The input cost of "J395" in the password before the correction is 6. The input cost of "93J5" in the corrected password is 8. Therefore, the input cost increases by 3. The output unit 165 may output, for example, a correction instruction to replace three or more characters.

Figure 13A:
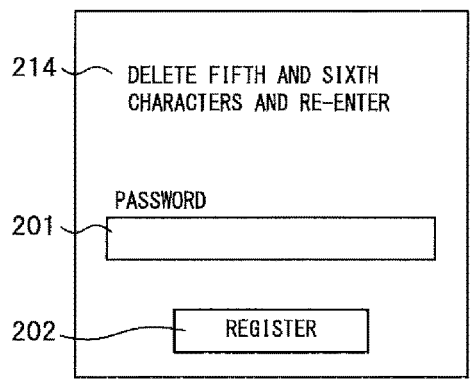
FIG. 13A illustrates a display example of a registration password re-input screen.
Figure 13B:
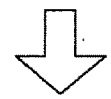
FIG. 13B illustrates an example of correction of a password by the user.

Next, a correction example in the case where the input cost of a password is higher than the upper limit value will be described. It is assumed that when the user inputs "o472Sj5xw0e" as a password first, the input cost is larger than the upper limit value. The output unit 165 may output, for example, as a correction instruction, character(s) to be deleted from a password. The output unit 165 may, for example, specify a character whose input cost is relatively high in the password as an object to be deleted. At this time, for example, the output unit 165 may specify characters to be deleted and the number of characters to be deleted on the basis of the difference between the input cost of the password before correction and the upper limit value. The output unit 165 may output the specified result as the correction instruction. FIG. 13A illustrates a display example of the registration password re-input screen. On the registration password re-input screen illustrated in FIG. 13A, a message 214 urging deletion of "Sj" included in the password is displayed. FIG. 13B illustrates an example of correction of a password by the user. For example, as illustrated in FIG. 13B, the user who sees the message 214 deletes "Sj" from the password. In the password before correction, the input cost of "Sj5" is 6. In the password after correction, the input cost of "5" is 1. Therefore, the input cost decreases by five.

Figure 13C:
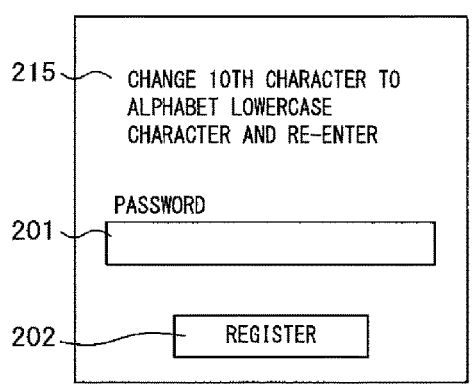
FIG. 13C illustrates a display example of a registration password re-input screen.
Figure 13D:
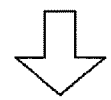
FIG. 13D illustrates an example of correction of a password by the user.

When the input cost changes depending on the character type, the output unit 165 may output, for example, as the correction instruction, an instruction to change a character type of a character as a part of a password to a character of another character type. In this case, the output unit 165 specifies a character to be changed and the character type after a change so as to decrease the input cost. FIG. 13C illustrates a display example of a registration password re-input screen. In the registration password re-input screen illustrated in FIG. 13C, a message 215 urging to change "0" included in the password to an English lowercase character is displayed. FIG. 13D illustrates an example of correction of the password by the user. The user who sees the message 214 changes, for example, as illustrated in FIG. 13D, "0" in the password to "a". In the password before the correction, the input cost of "0e" is 4. In the password before correction, the input cost of "ae" is 2. Therefore, the input cost decreases by 2. The output unit 165 may also output, for example, a correction instruction to change two or more characters.

Figure 13E:
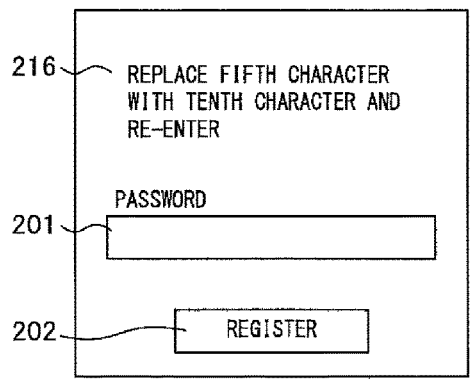
FIG. 13E illustrates a display example of a registration password re-input screen.
Figure 13F:
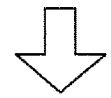
FIG. 13F illustrates an example of correction of a password by the user.

In the case that the input cost of a character which is input next varies depending on an immediately preceding input character or the character type of this character, the output unit 165 may output, for example, as a correction instruction, an instruction to replace a character with another character in the password. In this case, the output unit 165 may specify two characters to be replaced so as to decrease the input cost. FIG. 13E illustrates a display example of the registration password re-input screen. On the registration password re-input screen illustrated in FIG. 13E, a message 216 urging to replace "S" with "0" included in the password is displayed. FIG. 13F illustrates an example of correction of the password by the user. The user who sees the message 216 replaces, for example as illustrated in FIG. 13F, the position of "S" with the position of "0" in the password. In the password before the correction, the input cost of "Sj" is 5, and the input cost of "0e" is 4. In the password after the correction, the input cost of "0j" is 3, and the input cost of "Se" is 4. Therefore, the input cost decreases by 2. The output unit 165 may output, for example, a correction instruction to replace three or more characters.

The output unit 165 may output, for example, a different type of instruction from the instruction of the above-described types. The output unit 165 may output as a correction instruction, a predetermined type of instruction in the case where the input cost is less than the lower limit value and another predetermined type of instruction in the case where the input cost is higher than the upper limit value. The output unit 165 may, for example, determine any type from a plurality of types of correction instructions on the basis of a predetermined condition and output, as the correction instruction, an instruction of the determined type. The output unit 165 may combine a plurality of correction instructions.

FIG. 14 is a flowchart illustrating an example of an input password registration control process of the system controller 16 in the authentication device 1 according to the embodiment. In FIG. 14, the same reference signs are designated to processes that is the same as those of FIG. 8. As illustrated in FIG. 14, the system controller 16 executes steps S1 to S3. In step S3, when the determination result is set to be "proper" (step S3: YES), the output unit 165 executes steps S4 and S5. On the other hand, when the determination result is not set to be "proper" (step S3: NO), the output unit 165 makes determination in step S6. In step S6, when the determination result is not set as "improper" (step S6: NO), the output unit 165 executes step S8. On the other hand, when the determination result is set as "improper" (step S6: YES), the output unit 165 proceeds to step S41.

In step S41, the output unit 165 generates a copy of the input password. Next, the output unit 165 corrects the copy of the password (step S42). When the input cost of the password is less than the lower limit value, for example, the output unit 165 may calculate the cost difference between the input cost and the lower limit value. The output unit 165 may determine, for example, the number of characters corresponding to the cost difference. The output unit 165 may add characters of the determined number of characters to the copy of the password. In this case, the output unit 165 may determine a character to be added so that the input cost of the character to be added becomes the minimum. For example, the output unit 165 may determine a character to be changed in the copy of the password. For example, the output unit 165 may determine a character to be changed at random or on the basis of a predetermined condition. For example, the output unit 165 may determine a character whose input cost is the lowest in the password with reference to the input cost table. Subsequently, the output unit 165 may determine, for example as a character type after a change, a character type whose input cost is high among character types different from the character type of the determined character. The output unit 165 may change the character determined in the copy of the password to a predetermined character of the character type after the change. For example, the output unit 165 may determine a plurality of characters whose positions are replaced in the copy of the password. In this case, the output unit 165 may determine characters to be replaced at random or determine characters to be replaced on the basis of a predetermined condition. For example, the output unit 165 may determine a plurality of characters whose input cost is the lowest in the password with reference to the input cost table. The output unit 165 replaces the positions of the plurality of characters determined with one another in the copy of the password.

When the input cost of the password is higher than the upper limit value, the output unit 165 may determine, for example, a character to be deleted from the copy of the password. At this time, the output unit 165 may determine, for example, characters to be deleted at random or on the basis of a predetermined condition. For example, the output unit 165 may determine a character whose input cost is the highest in the password. For example, the output unit 165 may delete the determined character from the copy of the password. For example, the output unit 165 may determine a character to be changed in the copy of the password. For example, the output unit 165 may determine a character to be changed at random or determine a character to be changed on the basis of a predetermined condition. For example, the output unit 165 may determine a character whose input cost is the highest in the password with reference to the input cost table. Subsequently, the output unit 165 may determine, for example, a character type whose input cost becomes lower in a character type different from the character type of the determined character as the character type after the change. The output unit 165 may change the determined character in the copy of the password to a predetermined character of the character type after the change. For example, the output unit 165 may determine a plurality of characters whose positions are replaced in the copy of the password. In this case, the output unit 165 may determine a character to be replaced at random or determine a character to be replaced on the basis of a predetermined condition. For example, the output unit 165 may determine a plurality of characters whose input cost is the highest in the password with reference to the input cost table. The output unit 165 replaces the positions of the determined plurality of characters with one another in the copy of the password.

After step S42, the system controller 16 executes the password checking process (step S43). The password checking process and the input cost calculating process are as illustrated in FIGS. 9 and 10. In step S43, a process is executed on the copy of the corrected password. Subsequently, the output unit 165 determines whether the determination result is set as "proper" or not (step S44). When it is determined that the determination result in the password checking process is not set as "proper" (step S44: NO), the output unit 165 proceeds to step S41. When the copy of the password does not satisfy the registration requirement or when the copy of the password is not proper, the output unit 165 generates a new copy of the password (step S41) and corrects the new copy (step S42). At this time, for example, the output unit 165 changes, replaces, or deletes a character different from a character changed, a replaced character, or a deleted in the correction so far. For example, the output unit 165 may determine a character to be further changed, replaced, or deleted in addition to the character changed, the character replaced, or the character deleted in the correction so far. For example, the output unit 165 may change the number of characters added. In such a manner, the output unit 165 corrects the copy of the password until it is determined that the corrected copy of the password is proper.

When it is determined that the determination result is set as "proper" in step S44 (step S44: YES), the output unit 165 proceeds to step S45. In step S45, the output unit 165 outputs the web page of the registration password re-input screen to the user terminal 2. At this time, the output unit 165 adds a message indicating a correction instruction determined that the copy of the password is proper to the web page. After step S45, the output unit 165 finishes the input password registration control process.

As described above, according to the present embodiment, when it is determined that the password is not proper, the system controller 16 outputs an instruction on how to correct a password which is a correction instruction by which the password corrected is determined to be proper. Therefore, by correcting the password by the user on the basis of the output correction instruction, the input load of the corrected password can be maintained properly.

4. Fourth Embodiment

Next, a fourth embodiment will be described with reference to FIG. 15. In the present embodiment, the authentication device 1 automatically generates a password to be registered or set. By this operation, the authentication device 1 obtains a password to be determined to be proper or not. Also in the present embodiment, the authentication device 1 may be, for example, a server device or a terminal device. Except for a method of obtaining a password to be determined to be proper or not, the fourth embodiment is the same as the first or second embodiment.

If the authentication device 1 is a server device, the password obtaining unit 161 may generate, for example, a password of a user performing a member registration in the information processing system S1. At the time of changing the registered password, the password obtaining unit 161 may generate a new password after the change. If the authentication device 1 is a terminal device, for example, at the time of setting a password for using the authentication device 1, a predetermined function of the authentication device 1, or predetermined software, the password obtaining unit 161 may generate a password. At the time of changing a set password, the password obtaining unit 161 may generate a new password after change.

The output unit 165 outputs a password generated by the password obtaining unit 161 and determined to be proper by the propriety determining unit 164. If the authentication device 1 is a server device, the output unit 165 may, for example, cause a password to be displayed on the screen of the user terminal 2. For example, the output unit 165 may transmit an electronic mail describing a password to a target user. If the authentication device 1 is a terminal device, the output unit 165 may, for example, display a password on the display unit 14.

FIG. 15 is a flowchart illustrating an example of a password generation control process of the system controller 16 in the authentication device 1 according to the embodiment. If the authentication device 1 is a server device, for example, when the authentication device 1 receives a request for generating or changing a password from the user terminal 2, the system controller 16 may execute the password generation control process. If the authentication device 1 is a terminal device, for example, when the user requests generation or change of the password by operating the operation unit 13, the system controller 16 may execute the password generation control process. As illustrated in FIG. 15, the password obtaining unit 161 generates a password (step S51). For example, the password obtaining unit 161 may generate a plurality of characters constructing a password at random. At this time, for example, the password obtaining unit 161 may generate a password so as to satisfy a registration requirement. Subsequently, the system controller 16 executes a password checking process (step S52). The password checking process and the input cost calculating process are as illustrated in FIGS. 9 and 10. In step S52, a process is performed on a generated password. Subsequently, the password obtaining unit 161 determines whether the determination result in the password checking process is set as "proper" or not (step S53). When it is determined that the determination result is not set as "proper" (step S53: NO), the password obtaining unit 161 proceeds to step S51. In such a manner, the password obtaining unit 161 repeats generation of a password until a proper password is generated. On the other hand, when it is determined that the determination result is set as "proper" (step S53: YES), the password obtaining unit 161 proceeds to step S54. In step S54, the output unit 165 registers the generated password. If the authentication device 1 is a server device, the output unit 165 registers a user ID and a password so as to be associated with each other in the user information DB 3. IF the authentication device 1 is a terminal device, the output unit 165 stores the password into the storage unit 12. Subsequently, the output unit 165 outputs the generated password (step S55). The password outputting method is as described above. After step S55, the output unit 165 finishes the password generation control process.

As described above, according to the present embodiment, the system controller 16 generates a password according to a registration requirement, repeats generation of a password until it is determined that the generated password is proper, and outputs the password determined to be proper. Therefore, the input load of a password automatically generated can be maintained properly.

5. Fifth Embodiment

Next, a fifth embodiment will be described with reference to FIG. 16. In the present embodiment, when a password automatically generated is not proper, the authentication device 1 corrects the generated password, thereby regenerating a password to be determined to be proper or not. There is probability that a proper password can be generated faster by correcting a password than generation of a password at random each time. The password obtaining unit 161 may correct a password, for example, by the method described in the third embodiment. Except for the points to be described below, the fifth embodiment is the same as the fourth embodiment.

Figure 16:
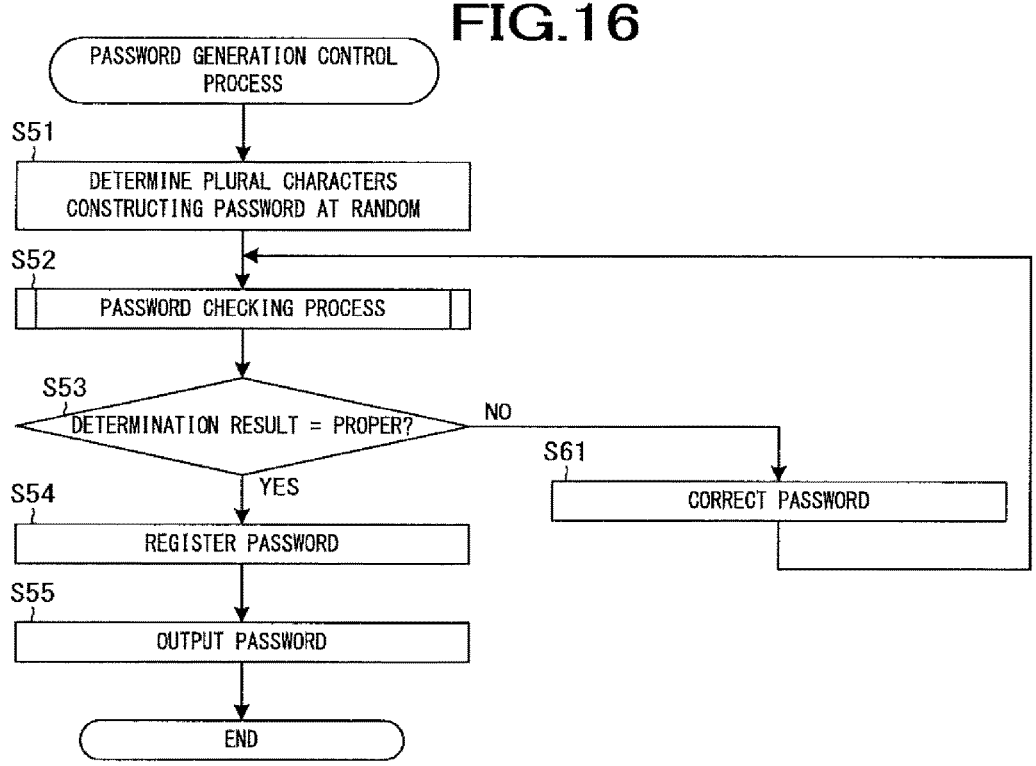
FIG. 16 is a flowchart illustrating an example of the password generation control process of the system controller 16 in the authentication device 1 according to an embodiment.

FIG. 16 is a flowchart illustrating an example of the password generation control process of the system controller 16 in the authentication device 1 according to the embodiment. In FIG. 16, the same reference signs are assigned to processes that is the same as those in FIG. 15. As illustrated in FIG. 16, the system controller 16 executes steps S51 to S53. In step S53, when the determination result is not set as "proper" (step S53: NO) the password obtaining unit 161 proceeds to step S61. In step S61, the password obtaining unit 161 generates a new password by correcting a generated password. The password correcting method may be the same as the method of correcting a copy of a password in step S42 of the input password registration control process illustrated in FIG. 14. Subsequently, the system controller 16 executes the password checking process (step S52). In this case, the process is executed on the corrected password. In such a manner, until it is determined that the password is proper, the password obtaining unit 161 adds correction on the generated password. When the determination result is set as "proper" in step S53 (step S53: YES), the output unit 165 executes steps S54 and S55.

As described above, according to the present embodiment, when it is determined that the generated password is not proper, the system controller 16 generates a new password by correcting the generated password. Therefore, it can facilitate to maintain the input load of a password generated properly more than generation of a new password regardless of the generated password.

6. Sixth Embodiment

Next, a sixth embodiment will be described with reference to FIG. 17. In the present embodiment, the authentication device 1 determines a registration requirement of a password on the basis of the type of the user terminal 2. In the present embodiment, the authentication device 1 may be, for example, a server device. Except for points to be described below, the sixth embodiment is the same as the first to fifth embodiments.

For example, there is a case that safety varies depending on the types of the user terminal 2. For example, in the case of comparing a personal computer and a smartphone, probability that a personal computer is shared by a plurality of users is higher than probability that a smartphone is shared by a plurality of users. Therefore, there is a case that safety of a personal computer is lower than that of a smartphone. Consequently, the password obtaining unit 161 may, for example, make a password registration requirement in the case where a personal computer is used stricter than that in the case where a smartphone is used. To make the registration requirement stricter, the registration requirement is determined so that complexity of a password increases. For example, the password obtaining unit 161 may increase the lower limit value of the number of characters of a password or may increase the number of character types included in a password. As an example of the registration requirement, for example, the number of characters for a personal computer is eight or larger, and a password may always include at least one each of an English uppercase character, an English lowercase character, and a number. For a smartphone, for example, the number of characters may be six or larger and a password may always include at least one alphabet (which may be an uppercase character or a lowercase character) and one number. Alternatively, for example, the authentication device 1 may loosen a registration requirement for a smartphone more than a registration requirement for a personal computer. Loosening the registration requirement means that a registration requirement is determined so as to decrease complexity of a password.

The same registration requirement may be applied to user terminals 2 of a plurality of types. For example, the same registration requirement may be applied to a smartphone, a cellular phone, and a PDA, and another registration requirement may be applied to a personal computer and an STB. For example, three or more registration requirements may exist.

The authentication device 1 may be configured so that one user uses a plurality types of user terminals 2 and can use the information processing system S1. The system controller 16 may be configured so that, for example, a registration requirement which varies among the types of the user terminals 2 is applied to the password, and the user can set a password which varies among the types of the user terminals 2. In this case, the system controller 16 may register passwords which vary among types of the user terminals 2 for one user in the user information DB 3 and authenticate the user by using the passwords which vary among the types of the user terminals 2.

In the storage unit 12, a plurality of pieces of registration requirement information are stored. The registration requirement information is information indicating a registration requirement. For example, the registration requirement information may include the upper and lower limit values of a password, character types which can be used for a password, necessary character types, and the like. Each registration requirement information is stored, for example, so as to be associated with a registration requirement ID. The registration requirement ID is identification information of registration requirement information. In the storage unit 12, a user agent/registration requirement conversion table may be stored. The user agent/registration requirement conversion table is a table in which user agent information and a registration requirement ID corresponding to the type of the user terminal 2 indicated by the user agent information are stored so as to be associated.

Figure 17:
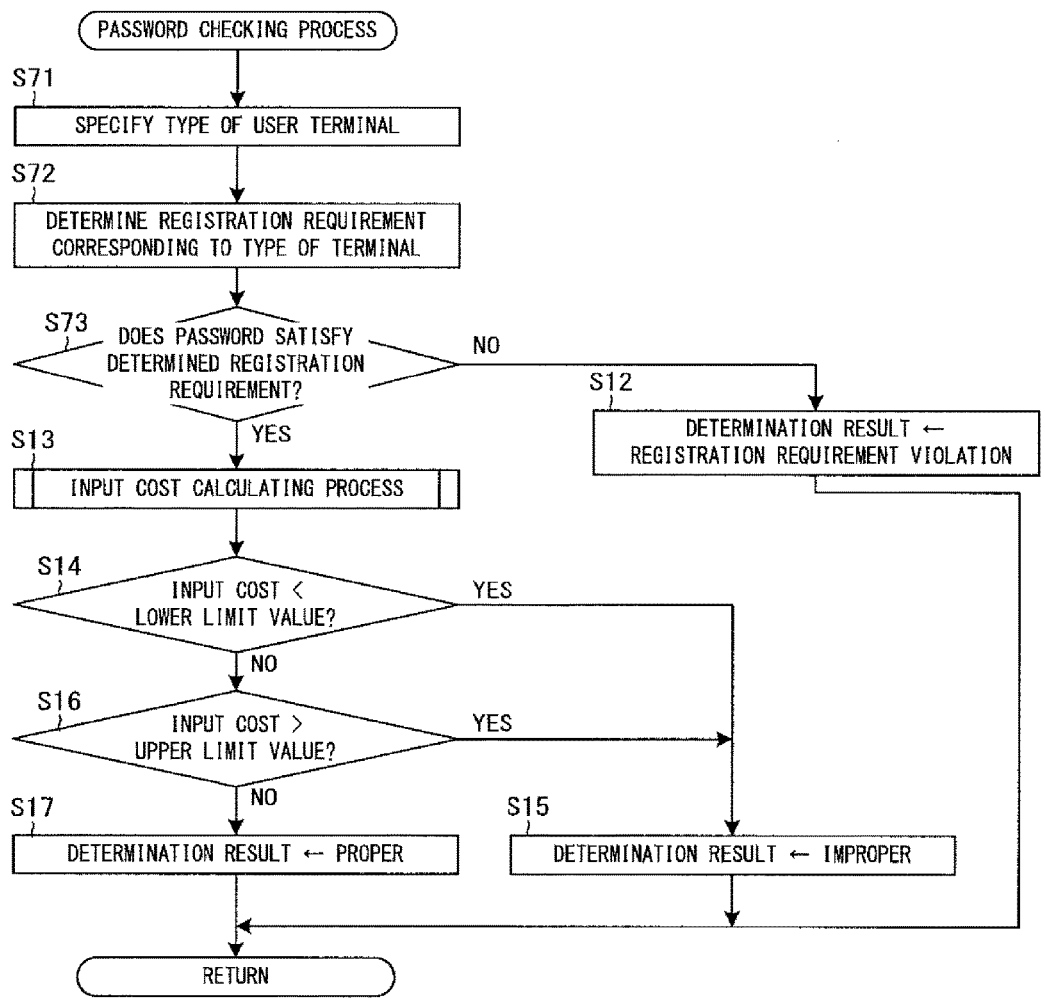
FIG. 17 is a flowchart illustrating an example of an input password checking process of the system controller 16 in the authentication device 1 according to an embodiment.

FIG. 17 is a flowchart illustrating an example of an input password checking process of the system controller 16 in the authentication device 1 according to the embodiment. In FIG. 17, the same signs are assigned to processes that is the same as those in FIG. 9. As illustrated in FIG. 17, the password obtaining unit 161 specifies the type of the user terminal 2 which requests registration of an input password or generation of a password (step S71). For example, the password obtaining unit 161 may obtain user agent information from a request from the user terminal 2. Subsequently, the password obtaining unit 161 determines a registration requirement corresponding to the type of the user terminal 2 (step S72). For example, the password obtaining unit 161 obtains a registration requirement ID corresponding to obtained user agent information from the user agent/registration requirement conversion table. Subsequently, the password obtaining unit 161 specifies registration requirement information corresponding to a registration requirement ID from the storage unit 12.

Subsequently, the password obtaining unit 161 determines whether a password satisfies a registration requirement or not on the basis of specified registration requirement information (step S73). For example, when the number of characters of a password is smaller than the lower limit value or larger than the upper limit value, the password obtaining unit 161 determines that the password does not satisfy the registration requirement. For example, when a password includes a character different from a character of a character type which can be used and a character of a necessary character type, the password obtaining unit 161 determines that the password does not satisfy the registration requirement. For example, when the password does not include a character of a necessary character type, the password obtaining unit 161 determines that the password does not satisfy the registration requirement. When it is determined that the password does not satisfy the registration requirement (step S73: NO), the password obtaining unit 161 proceeds to step S12. On the other hand, when it is determined that the password satisfies the registration requirement (step S73: YES), the password obtaining unit 161 proceeds to step S13. In a manner that is the same as the first embodiment, the system controller 16 executes the steps S13 to S17.

As described above, according to the present embodiment, the system controller 16 specifies the type of the user terminal 2 used to input a password, determines a registration requirement on the basis of the specified type, and obtains a password according to the determined registration requirement. Therefore, a registration requirement adapted to the type of the user terminal 2 can be set.

In each of the foregoing embodiments, authentication information is applied to a password. However, authentication information may be applied to information different from a password. For example, authentication information can be applied to information used for authentication, which can be input by the user, and for which a condition of complexity is determined. For example, authentication information may be applied to identification information of a user. The authentication information may include a code different from a code indicating a character or a sign. The authentication information may include a character which can be input by an operation of a user. For example, the authentication information may include a code indicating an image, an icon, a symbol, a sign, or the like.

REFERENCE SIGNS LIST 1 authentication device
2 user terminal
3 user information DB
11 communication unit
12 storage unit
13 operation unit
14 display unit
15 input/output interface
16 system controller
16a CPU
16b ROM
16c RAM
17 system bus
161 password obtaining unit
162 character input cost obtaining unit
163 password input cost calculating unit
164 propriety determining unit
165 output unit
NW network
S1, S2 information processing system

The invention claimed is:
1. An information processing apparatus comprising:
at least one memory configured to store program instructions;
at least one processor configured to read the program instructions and operate according to the program instructions, the program instructions including:
authentication information obtaining instructions configured to cause at least one of the at least one processor to obtain authentication information including a plurality of codes and conforming to a predetermined requirement of complexity;
value obtaining instructions configured to cause at least one of the at least one processor to obtain a value of inputting each of the plurality of codes, based on a number of times of switching from a group of input components for inputting each of the plurality of codes to another group of input components for inputting each of the plurality of codes, in an input environment in which each of a plurality of groups of input components for input is configured to be switched, a plurality of inputtable codes being assigned to each of the plurality of groups of input components;
calculating instructions configured to cause at least one of the at least one processor to calculate an input value of the authentication information, based on the obtained value of inputting each of the plurality of codes;

determining instructions configured to cause at least one of the at least one processor to determine propriety of the authentication information, based on the calculated input value; and output instructions configured to cause at least one of the at least one processor to output the determined propriety.

2. The information processing apparatus according to claim 1, wherein the value obtaining instructions are further configured to cause at least one of the at least one processor to obtain the value, based on a number of times of operations for inputting each of the plurality of codes included in the authentication information.

3. The information processing apparatus according to claim 1, wherein the value obtaining instructions are further configured to cause at least one of the at least one processor to obtain the value, based on a position of an input component, among a plurality of input components, to which each of the plurality of codes included in the authentication information is assigned, in the input environment in which the plurality of input components are disposed and a plurality of inputtable codes are respectively assigned to the plurality of input components.

4. The information processing apparatus according to claim 1, further comprising specifying instructions configured to cause at least one of the at least one processor to specify an input environment that is used to input the authentication information, wherein the value obtaining instructions are further configured to cause at least one of the at least one processor to obtain the value, based on a rule of determining value corresponding to the specified input environment.

5. The information processing apparatus according to claim 1, wherein the authentication information obtaining instructions are further configured to cause at least one of the at least one processor to obtain the authentication information that is input from a user operation.

6. The information processing apparatus according to claim 5, wherein the output instructions are further configured to cause at least one of the at least one processor to, when it is determined that the authentication information is not proper, output an instruction on how to correct the authentication information, and the determining instructions are further configured to cause at least one of the at least one processor to determine that the authentication information after the correction is proper.

7. The information processing apparatus according to claim 1, wherein the authentication information obtaining instructions are further configured to cause at least one of the at least one processor to generate authentication information conforming to the predetermined requirement of complexity, and repeat the generation of authentication information until the generated authentication information is determined to be proper by the determining instructions, and the output instructions are further configured to cause at least one of the at least one processor to output the authentication information determined to be proper.

8. The information processing apparatus according to claim 7, wherein the authentication information obtaining instructions are further configured to cause at least one of the at least one processor to, when it is determined that the generated authentication information is not proper, generate, by correcting the generated authentication information, new authentication information.

9. The information processing apparatus according to claim 1, further comprising:

type specifying instructions configured to cause at least one of the at least one processor to specify a type of a terminal that is used for inputting the authentication information; and requirement determining instructions configured to cause at least one of the at least one processor to determine the requirement of complexity, based on the specified type, wherein the authentication information obtaining instructions are further configured to cause at least one of the at least one processor to obtain authentication information conforming to the determined requirement of complexity.

10. An information processing method executed by a computer, the method comprising:

obtaining authentication information including a plurality of codes and conforming to a predetermined requirement of complexity;

obtaining a value of inputting each of the plurality of codes, based on a number of times of switching from a group of input components for inputting each of the plurality of codes to another group of input components for inputting each of the plurality of codes, in an input environment in which each of a plurality of groups of input components for input is configured to be switched, a plurality of inputtable codes being assigned to each of the plurality of groups of input components;

calculating an input value of the authentication information, based on the obtained value of inputting each of the plurality of codes;

determining propriety of the authentication information, based on the calculated input value; and outputting the determined propriety.

11. A non-transitory computer readable medium storing thereon an information processing program, the information processing program causing a computer to:

obtain authentication information including a plurality of codes and conforming to a predetermined requirement of complexity;

obtain a value of inputting each of the plurality of codes, based on a number of times of switching from a group of input components for inputting each of the plurality of codes to another group of input components for inputting each of the plurality of codes, in an input environment in which each of a plurality of groups of input components for input is configured to be switched, a plurality of inputtable codes being assigned to each of the plurality of groups of input components;

calculate an input value of the authentication information, based on the obtained value of inputting each of the plurality of codes;

determine propriety of the authentication information, based on the calculated input value; and output the determined propriety.

* * * * *